United States Patent
Camilletti et al.

(10) Patent No.: US 9,567,169 B2
(45) Date of Patent: Feb. 14, 2017

(54) HAY FEEDER FOR LARGE SQUARE BALES

(71) Applicant: Western Pro Feeders, LLC

(72) Inventors: Nicholas K. Camilletti, Hayden, CO (US); Giacomo D. Camilletti, Hayden, CO (US)

(73) Assignee: Hay-Den Feeder, LLC, Hayden, CO (US)

( * ) Notice: Subject to any disclaimer, the term of this patent is extended or adjusted under 35 U.S.C. 154(b) by 252 days.

(21) Appl. No.: 14/275,005

(22) Filed: May 12, 2014

(65) Prior Publication Data

US 2015/0320013 A1 Nov. 12, 2015

(51) Int. Cl.
| | | |
|---|---|---|
| *A01K 61/02* | (2006.01) | |
| *B65G 65/32* | (2006.01) | |
| *A01K 1/10* | (2006.01) | |
| *A01K 5/01* | (2006.01) | |

(52) U.S. Cl.
CPC .................. *B65G 65/32* (2013.01); *A01K 1/10* (2013.01); *A01K 5/01* (2013.01)

(58) Field of Classification Search
CPC ............ A01K 1/10; A01K 5/01; A01K 1/105; A01K 5/00; A01K 5/0225; B65G 65/32
USPC ........................................................ 119/57.1
See application file for complete search history.

(56) References Cited

U.S. PATENT DOCUMENTS

| | | |
|---|---|---|
| 310,261 A | 1/1885 | Downing |
| 457,784 A | 8/1891 | Lapham |
| 4,078,523 A | 3/1978 | Etzler |
| 4,237,821 A | 12/1980 | Haines |
| 4,949,675 A | 8/1990 | Parks |
| 5,237,962 A | 8/1993 | Garman |
| 5,311,840 A | 5/1994 | Rumbaugh |
| 5,784,997 A | 7/1998 | Perez |
| 6,213,053 B1 * | 4/2001 | Lammers ............. A01K 5/0107 119/51.01 |
| 7,055,459 B2 * | 6/2006 | Fehringer ............ A01K 5/0291 119/51.13 |
| 8,763,555 B2 * | 7/2014 | Kurtz ....................... A01K 5/01 119/58 |
| 2005/0284383 A1 * | 12/2005 | Fehringer ............ A01K 5/0291 119/51.13 |
| 2007/0181069 A1 | 8/2007 | Jack |

(Continued)

OTHER PUBLICATIONS

PCT Search Report and Written Opinion for PCT/US2015/029987, dated Aug. 17, 2015, 13 pages.

*Primary Examiner* — Kristen C Hayes
(74) *Attorney, Agent, or Firm* — W. Scott Carson

(57) ABSTRACT

A hay feeder for large square bales (e.g., 3'×3'×8' ones weighting on the order of 700-800 pounds). The feeder is designed to be operable by one person to load the bale into the feeder and includes an elongated chute with four, vertical side members. In use, one of the side members can be pivoted downwardly to a substantially horizontal position and the elongated hay bale positioned on it. Thereafter, it can be raised back to its vertical position to lift the hay bale with it to a vertical position within the elongated chute. The chute and bale have respective upper and lower end sections and the chute has openings at its lower end section to provide access through them to the lower end section of the hay bale. Cover members are provided to selectively cover and uncover the openings to selectively permit and prevent access through them by the livestock.

31 Claims, 31 Drawing Sheets

(56) References Cited

U.S. PATENT DOCUMENTS

| | | | | |
|---|---|---|---|---|
| 2010/0212597 A1* | 8/2010 | Wolfe | ............... | A01K 5/0107 119/58 |
| 2010/0263597 A1* | 10/2010 | Kerns | ............... | A01K 5/01 119/60 |
| 2011/0253053 A1* | 10/2011 | Kurtz | ............... | A01K 5/01 119/60 |

* cited by examiner

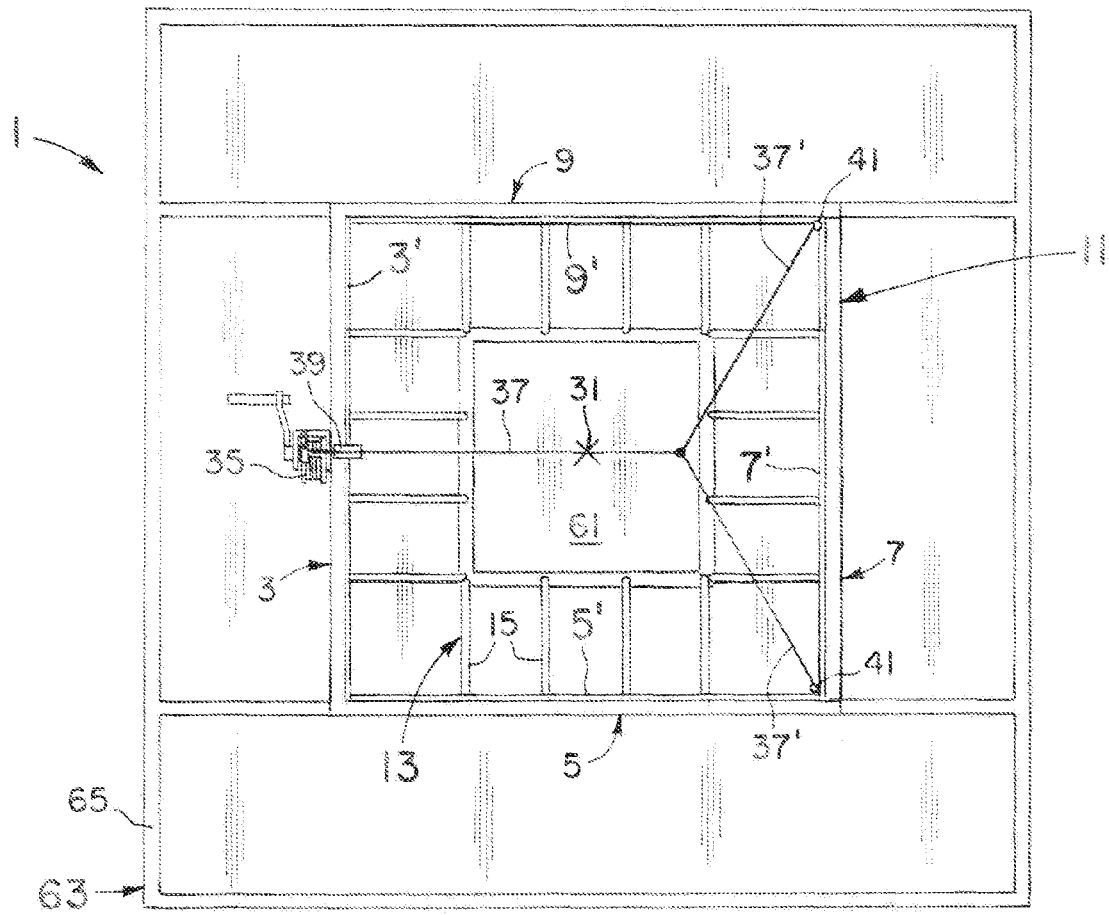
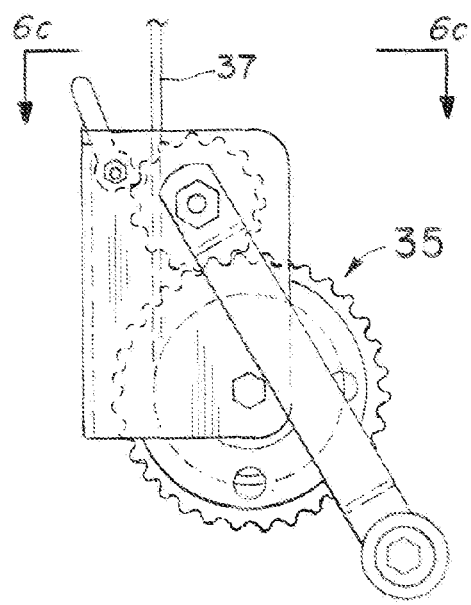
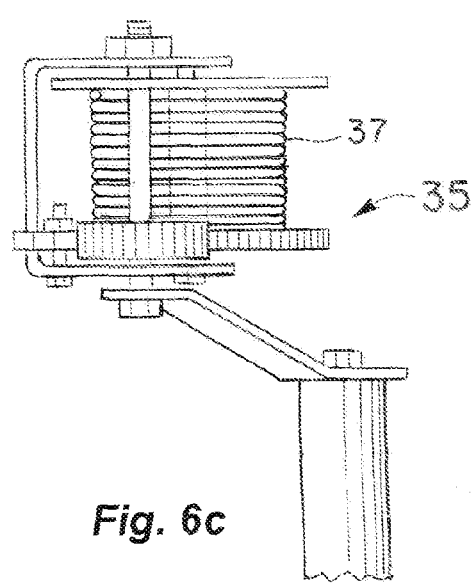
Fig. 6a
Fig. 6b
Fig. 6c

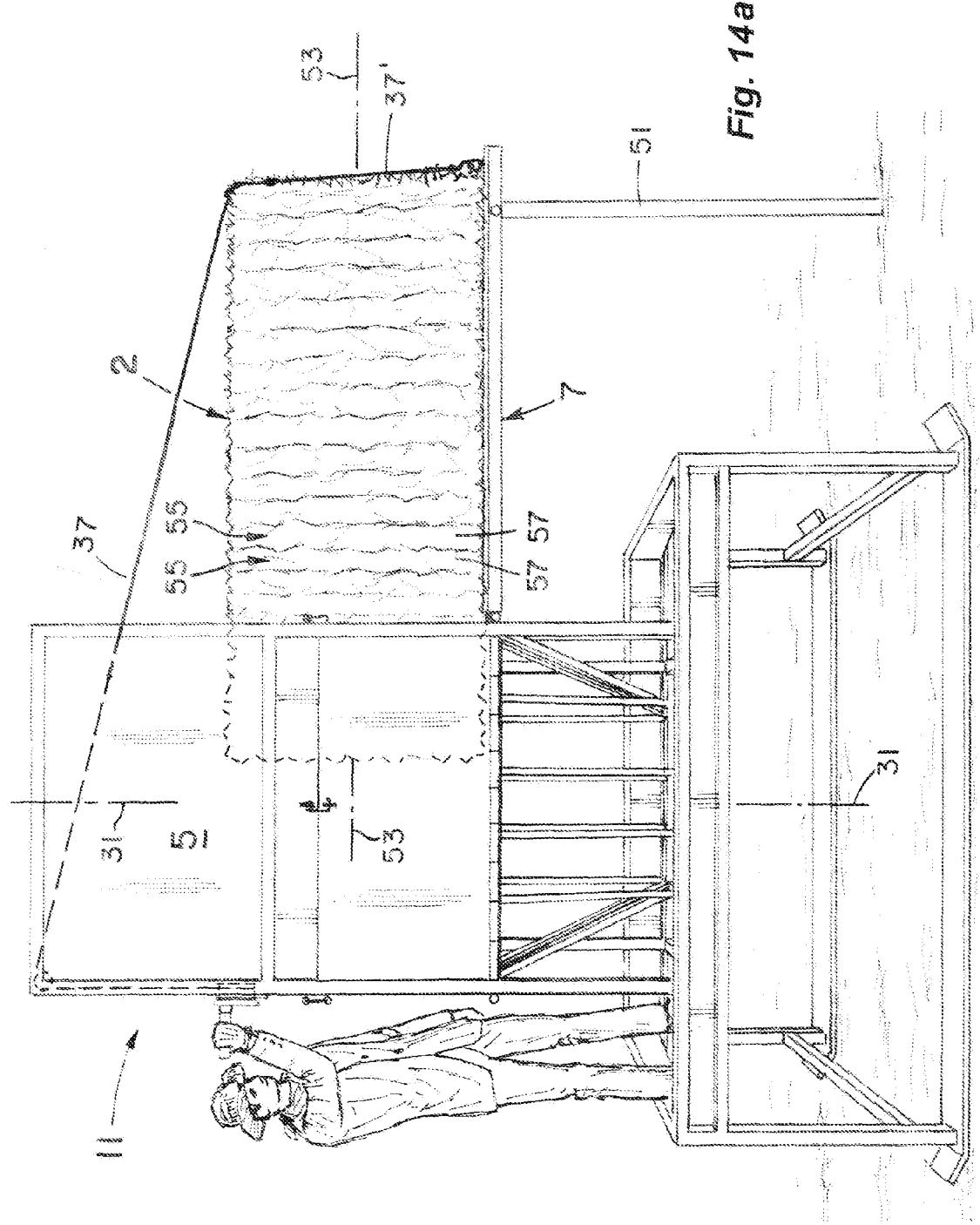

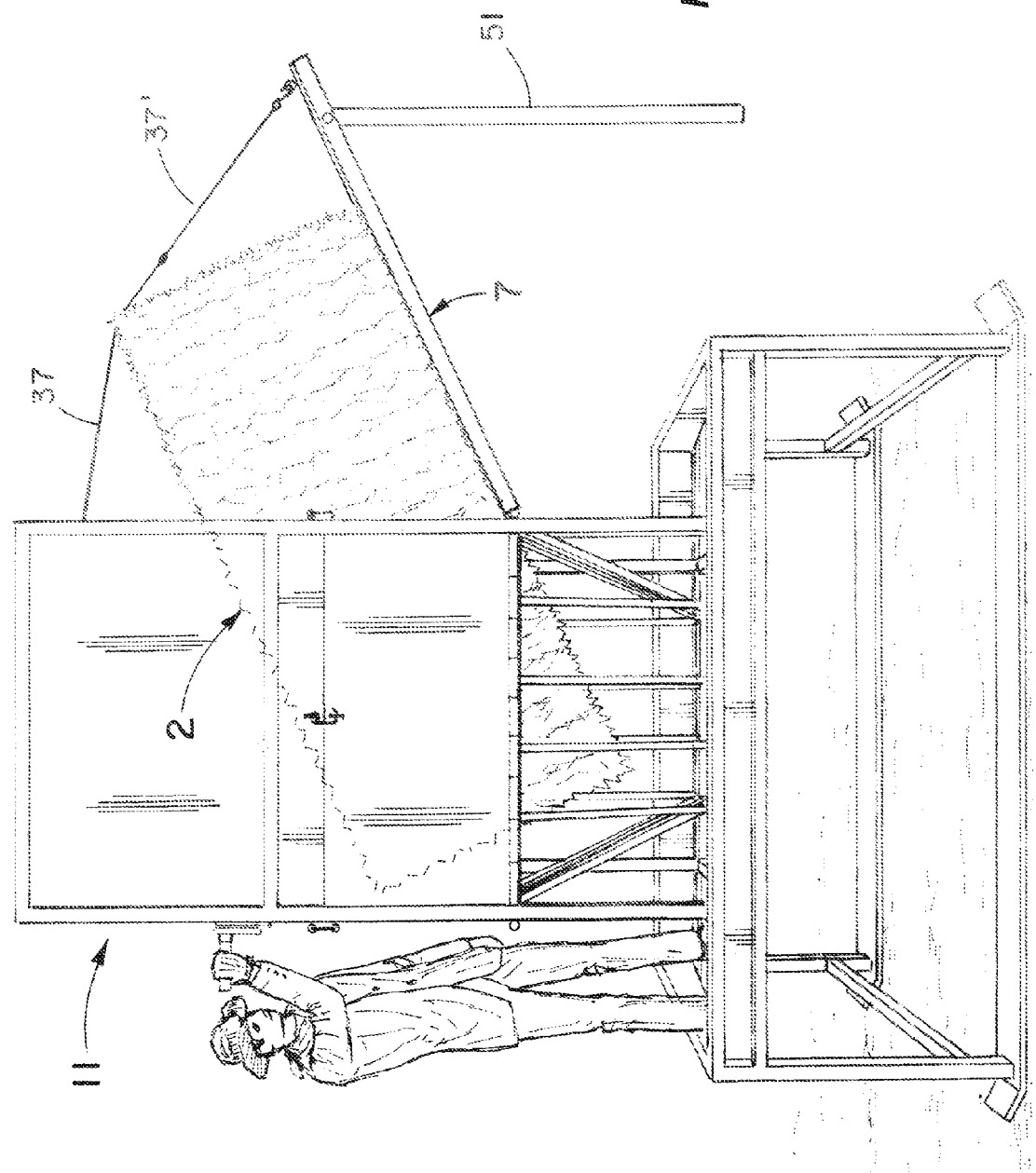

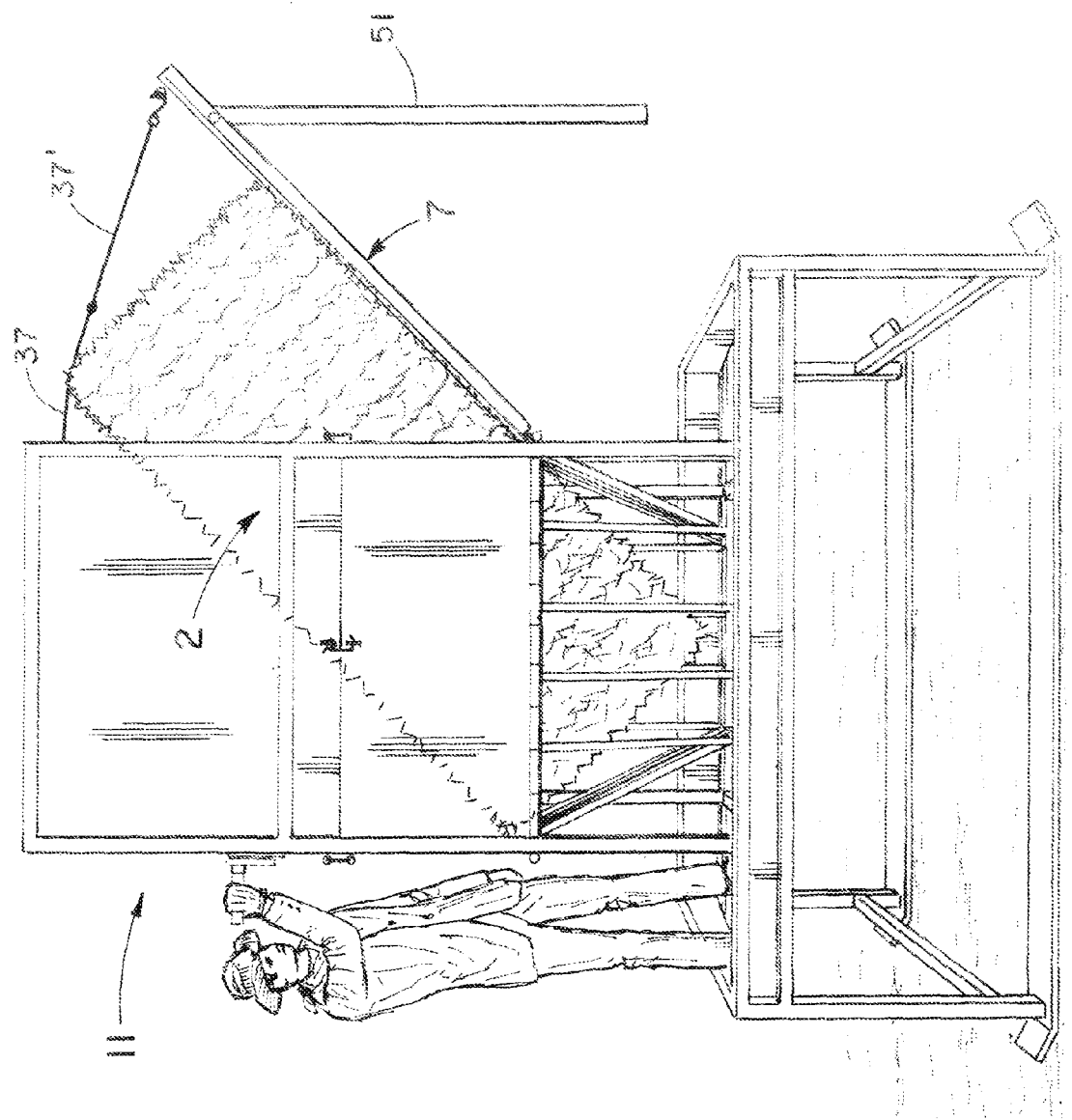

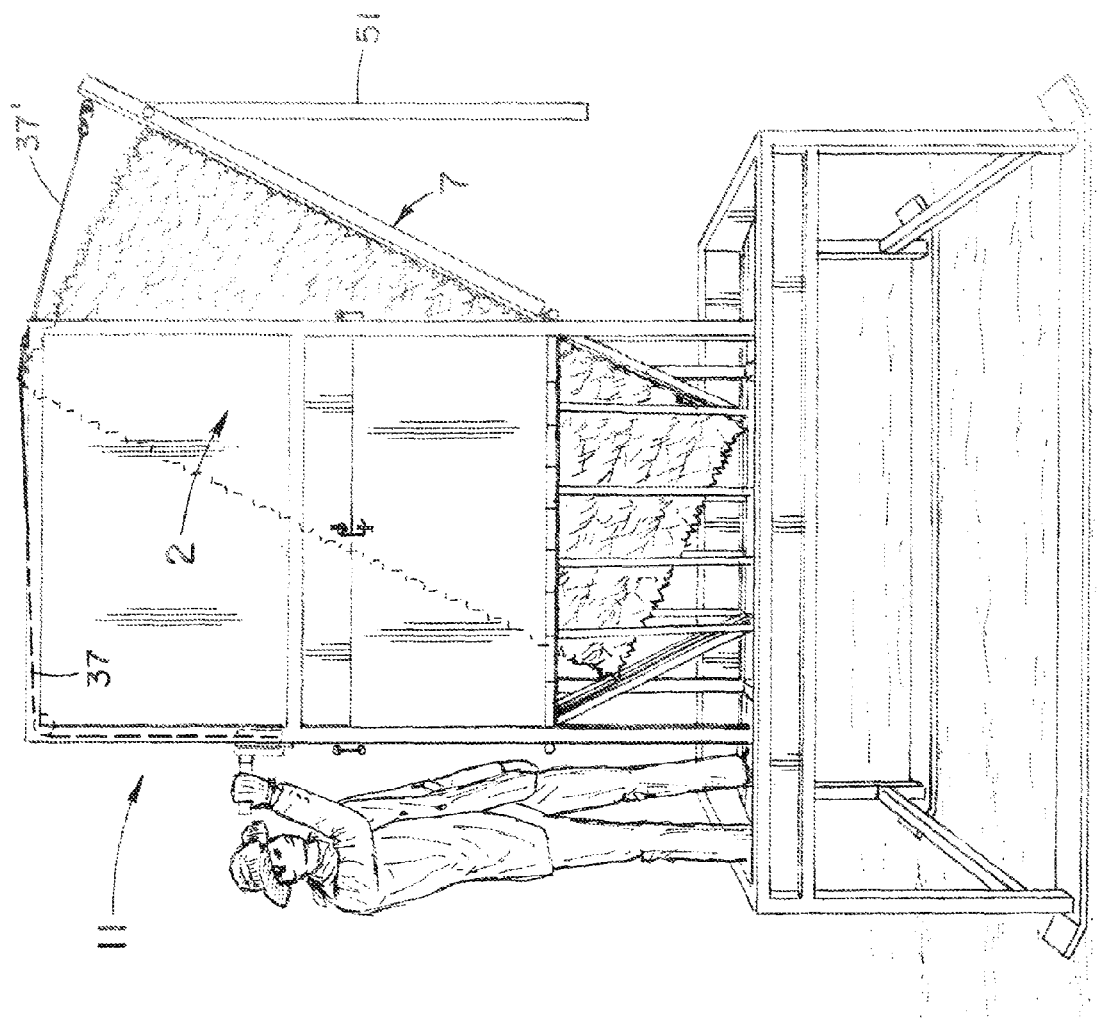

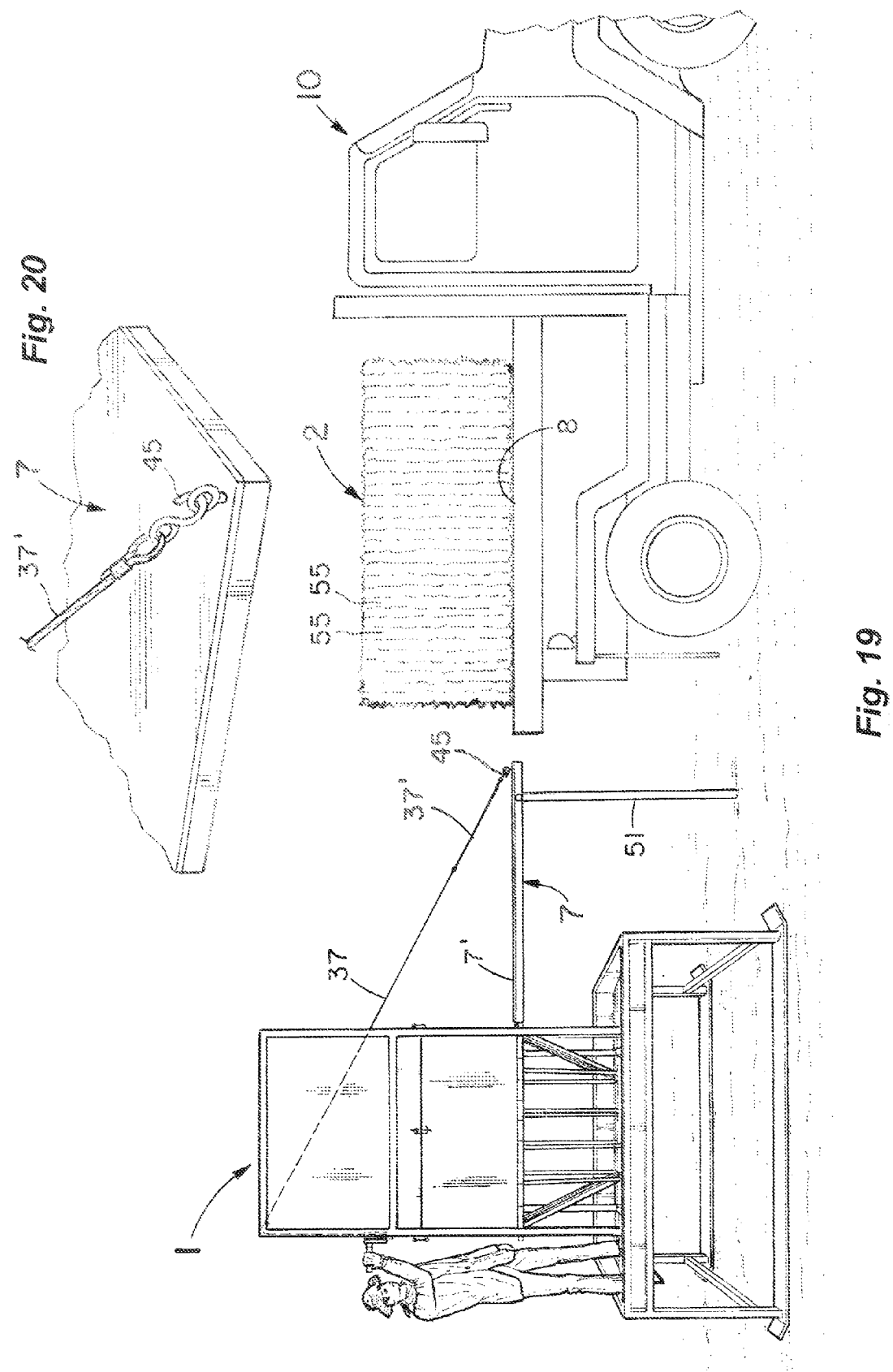

HAY FEEDER FOR LARGE SQUARE BALES

BACKGROUND OF THE INVENTION

1. Field of the Invention

This invention relates to the field of hay feeders for livestock such as horses and cattle and more particularly to the field of such feeders for handling large square bales.

2. Discussion of the Background

Hay bales for livestock such as horses and cattle have evolved over the years from relatively small bales (e.g., 16 inches by 18 inches by 3 feet weighing 40-60 pounds) that could easily be lifted manually by one person to very large round bales (e.g., 6 foot diameter by 5 feet wide weighing on the order of 1500 pounds) and large square bales (e.g., 3×3×8 feet weighing about 700-800 pounds) that require loaders and other equipment to lift and manipulate. The trend to larger bales was mostly a result of rising labor costs but other factors were also involved. Although large round bales have been and remain in widespread use because they can be left uncovered if desired in the field without significant deterioration, large square bales are becoming more popular. In this last regard, the price of hay has risen dramatically over the recent years to the extent that even though round bales were previously considered not to significantly deteriorate (e.g., the outer few inches would weather and form somewhat of a protective layer), even such relatively small deterioration still could represent 10 percent or more of the total dry matter of the bale. Consequently and although large square bales normally need to be stacked and covered, the waste is usually then limited and much less in comparison to round bales left uncovered in the field.

Handling large square bales on the order of 3×3×8 feet and 700-800 pounds still does require equipment to lift and manipulate the bales but there is need for a hay feeder for large square bales that can be easily loaded and operated by one person with very little hay waste.

With this and other things in mind, the present invention was developed. In it, a hay feeder is provided that can handle large square bales and can be easily loaded and operated to feed livestock by one person. In one mode of operation, the small and usually busy rancher or horse owner can have an individual bale loaded onto the bed of a truck at the hay seller's site after which the rancher or owner can return to his or her ranch and unload the bale from the truck bed into the feeder by himself or herself saving both time and money. In another mode and if the rancher or owner has a loader, he or she can still easily manipulate the large square bale without anyone else's help into the feeder where it is supported in a vertical position for feeding to the livestock from the lower end section of the vertical bale.

SUMMARY OF THE INVENTION

This invention involves a hay feeder for large square bales (e.g., 3'×3'×8' ones weighting on the order of 700-800 pounds). The feeder is designed to be operable by one person to load the bale into the feeder. The feeder has an elongated chute with four, vertical side members. In use, one of the side members can be pivoted downwardly to a substantially horizontal position and the elongated hay bale positioned on it. The side member can then be raised back to its vertical position to lift the hay bale with it to a vertical position within the elongated chute. The chute and bale have respective upper and lower end sections and the chute has openings at its lower end section to provide access through them to the lower end section of the hay bale. Cover members are also provided to selectively cover and uncover the openings to selectively permit and prevent access through them by the livestock.

BRIEF DESCRIPTION OF THE DRAWINGS

FIG. 6*a* is a plan view of the hay feeder taken along line 6*a*-6*a* of FIG. 2.

FIGS. 6*b* and 6*c* are enlarged views of the ratchet of the hay feeder.

FIGS. 13-18 sequentially show how the hay bale of FIG. 12 can be drawn toward and lifted up into the hay feeder.

FIGS. 19-24 sequentially show how a hay bale can be loaded onto the lowered side member of the chute of the hay feeder directly from the bed of a pickup truck.

DETAILED DESCRIPTION OF THE INVENTION

Figure 1:
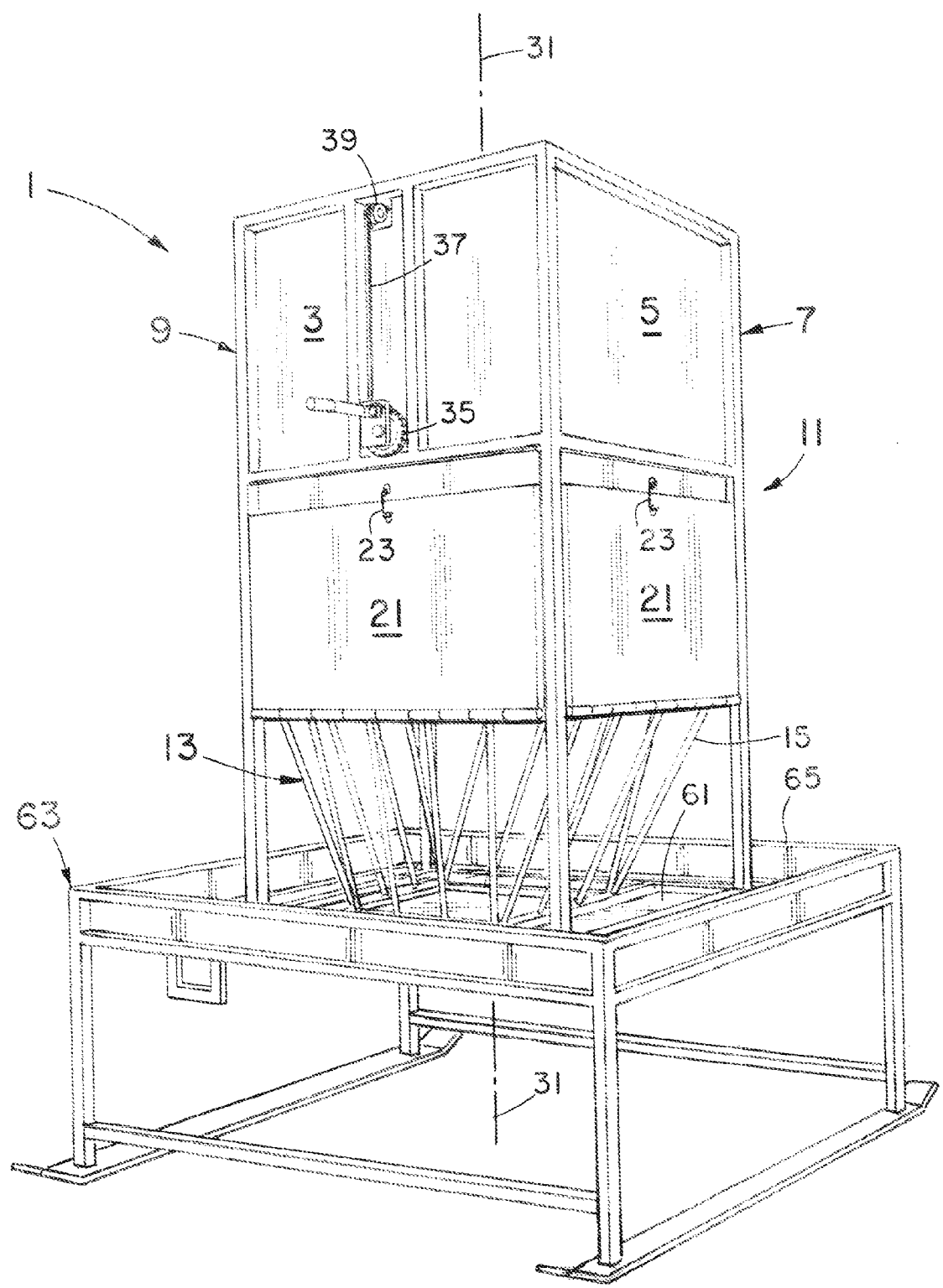
FIG. 1 is a rear perspective view of the hay feeder of the present invention.
Figure 2:
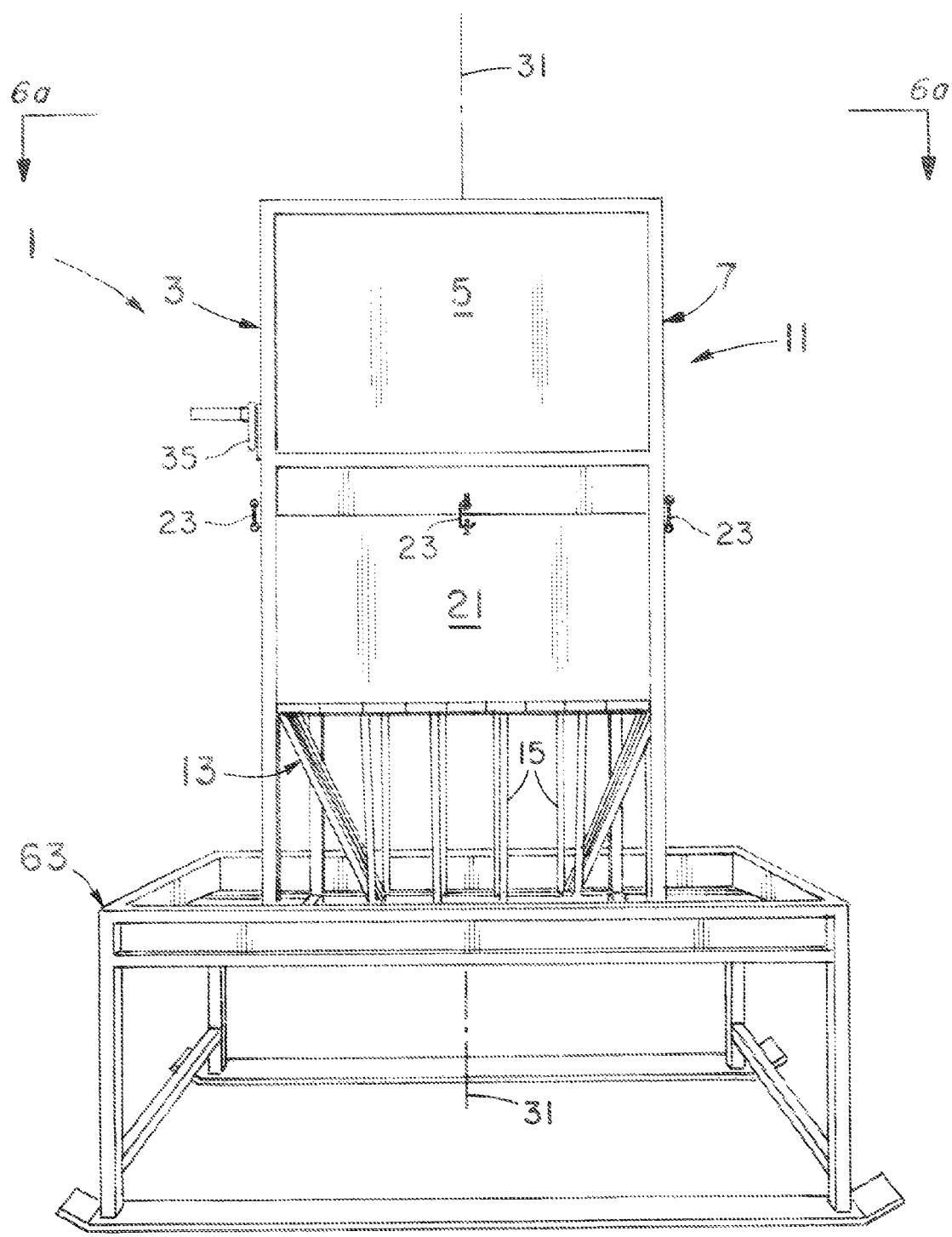
FIG. 2 is a side elevational view of the hay feeder.
Figure 3:
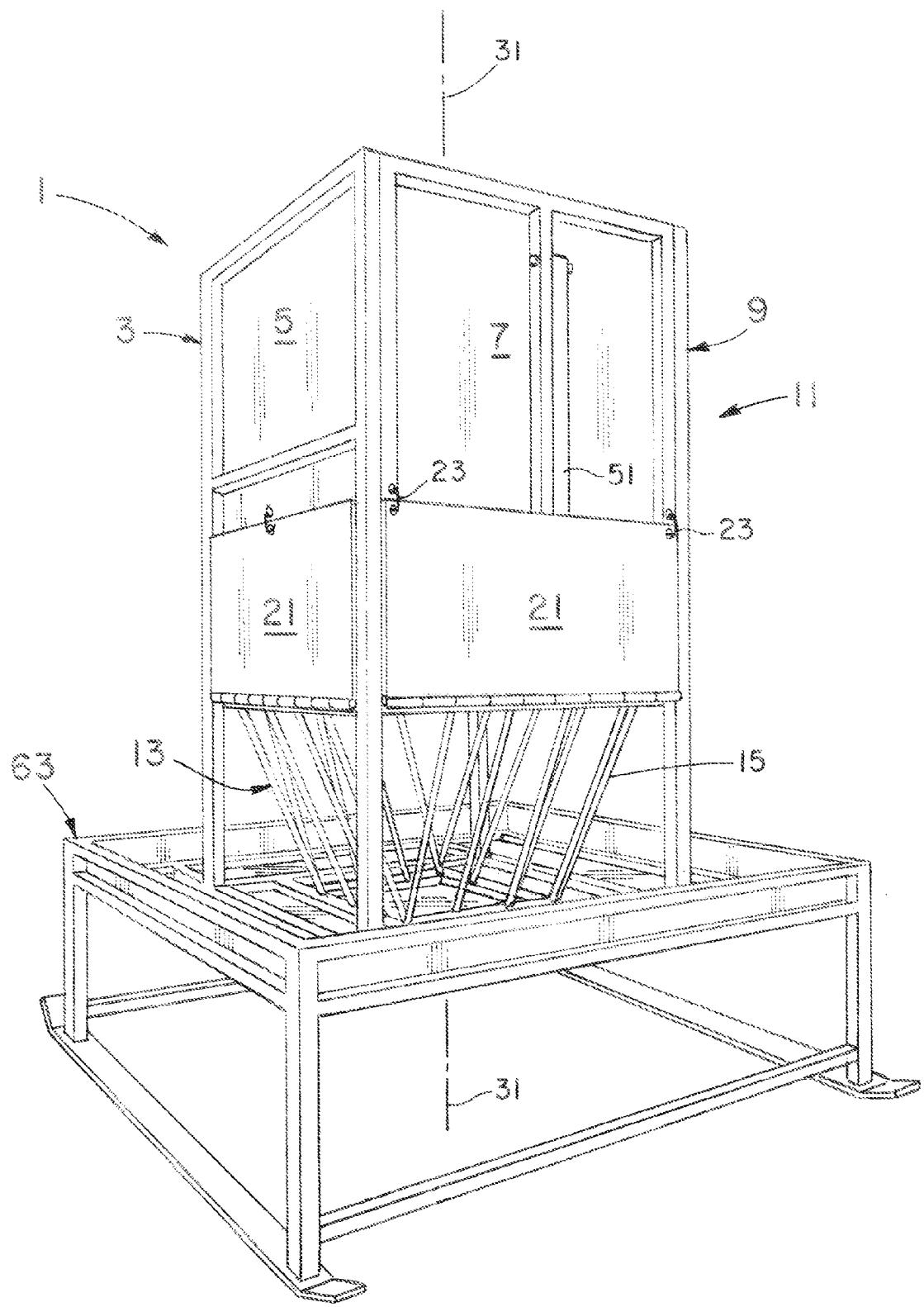
FIG. 3 is a front perspective view.

FIG. 1 is a rear perspective view of the hay feeder 1 of the present invention. FIG. 2 is a side view of the hay feeder 1 and FIG. 3 is a front perspective view. As shown, the hay feeder 1 preferably has four side members 3, 5, 7, 9 extending substantially vertically to form the upper section of an elongated chute 11. The lower section of the chute 11 as illustrated has a grate 13 of inwardly and downwardly inclined bars 15 positioned therein (see also FIG. 4). In operation as explained in more detail below and with the cover members 21 pivoted upwardly and held in place (e.g., by the hooks at 23—see also FIG. 5), lower openings are then created below each side member 3, 5, 7, 9 to provide access to the lower end section of the chute 11 and grate 13.

Figure 4:
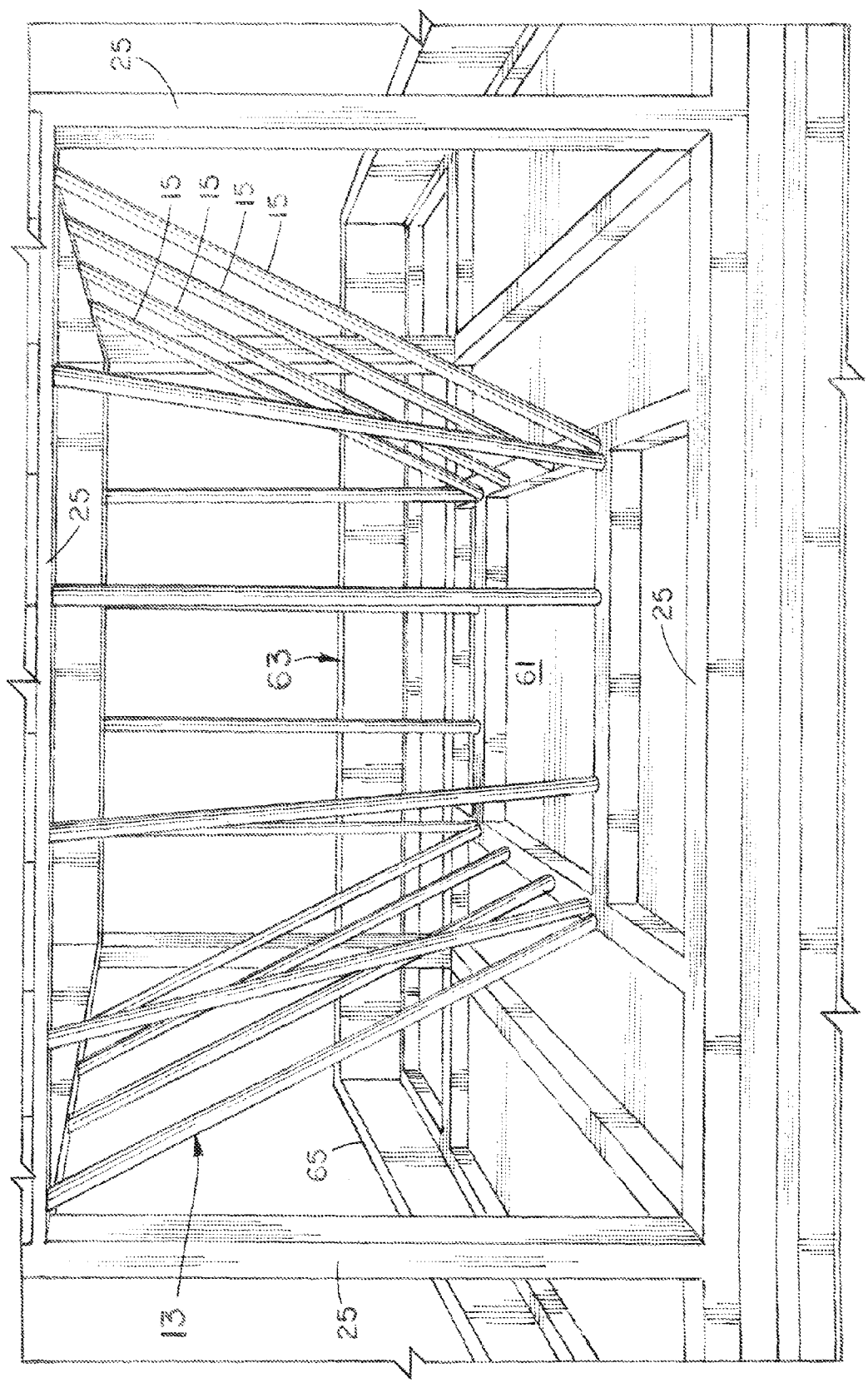
FIG. 4 is an enlarged view of the grate in the lower end section of the chute of the hay feeder.
Figure 5:
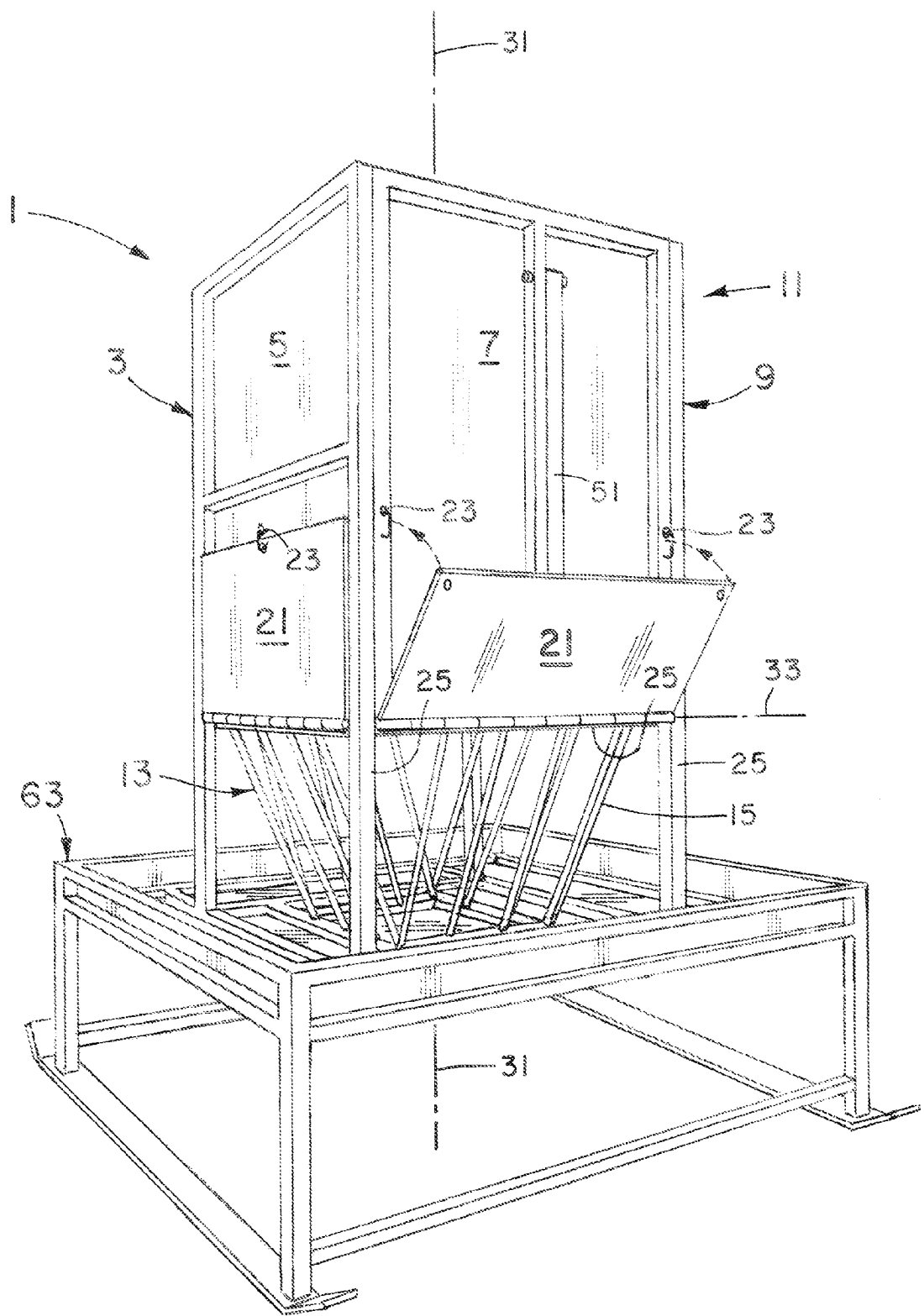
FIG. 5 is a view similar to FIG. 3 showing the pivoting motion of one of the side cover members that selectively permit and prevent access to the lower end section of the chute and the grate in the lower section of the chute.

Each of the four openings as illustrated in FIGS. 4 and 5 is essentially defined by frame members 25 (FIG. 4) but could be defined by other structure including the sets of inclined bars 15 on each of the four sides of the grate 13.

Figure 7:
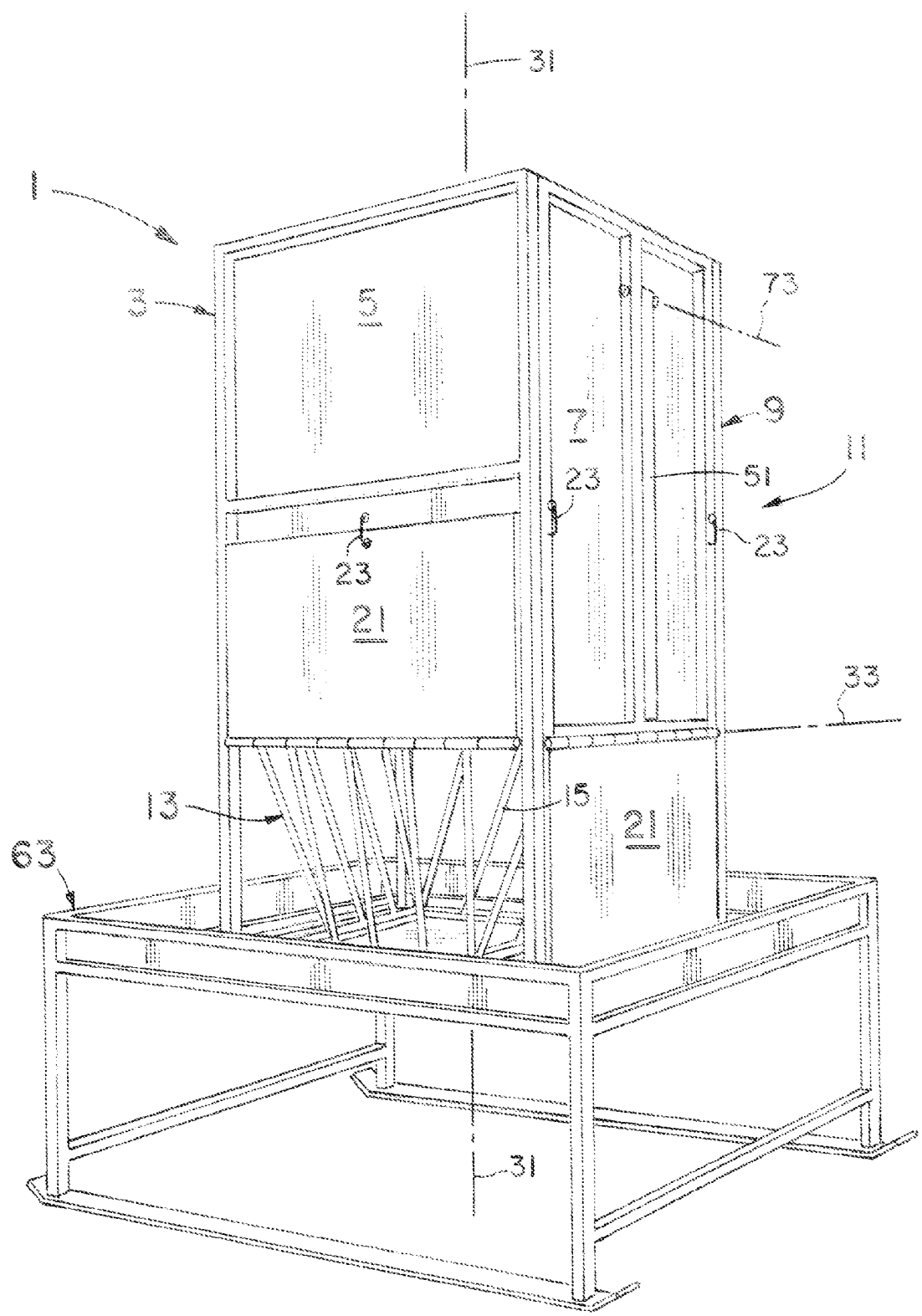
FIG. 7 is a front perspective view of the hay feeder similar to FIG. 3 with the cover member for the one side member pivoted downwardly.
Figure 8:
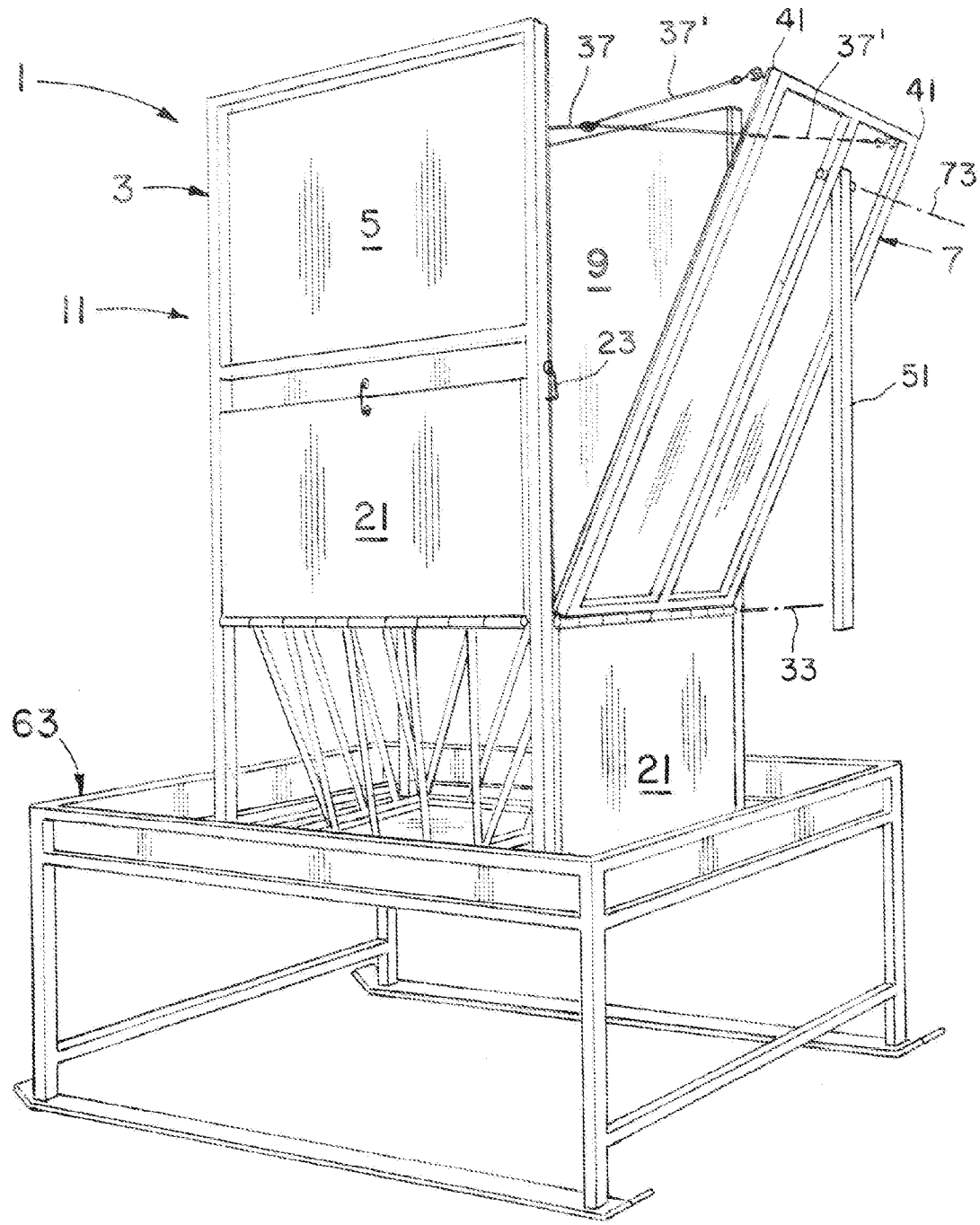
FIGS. 8-10 together with FIG. 7 sequentially show the one side member being pivotally lowered from its vertical closed position of FIG. 7 to its horizontal open position of FIG. 10.
Figure 9:
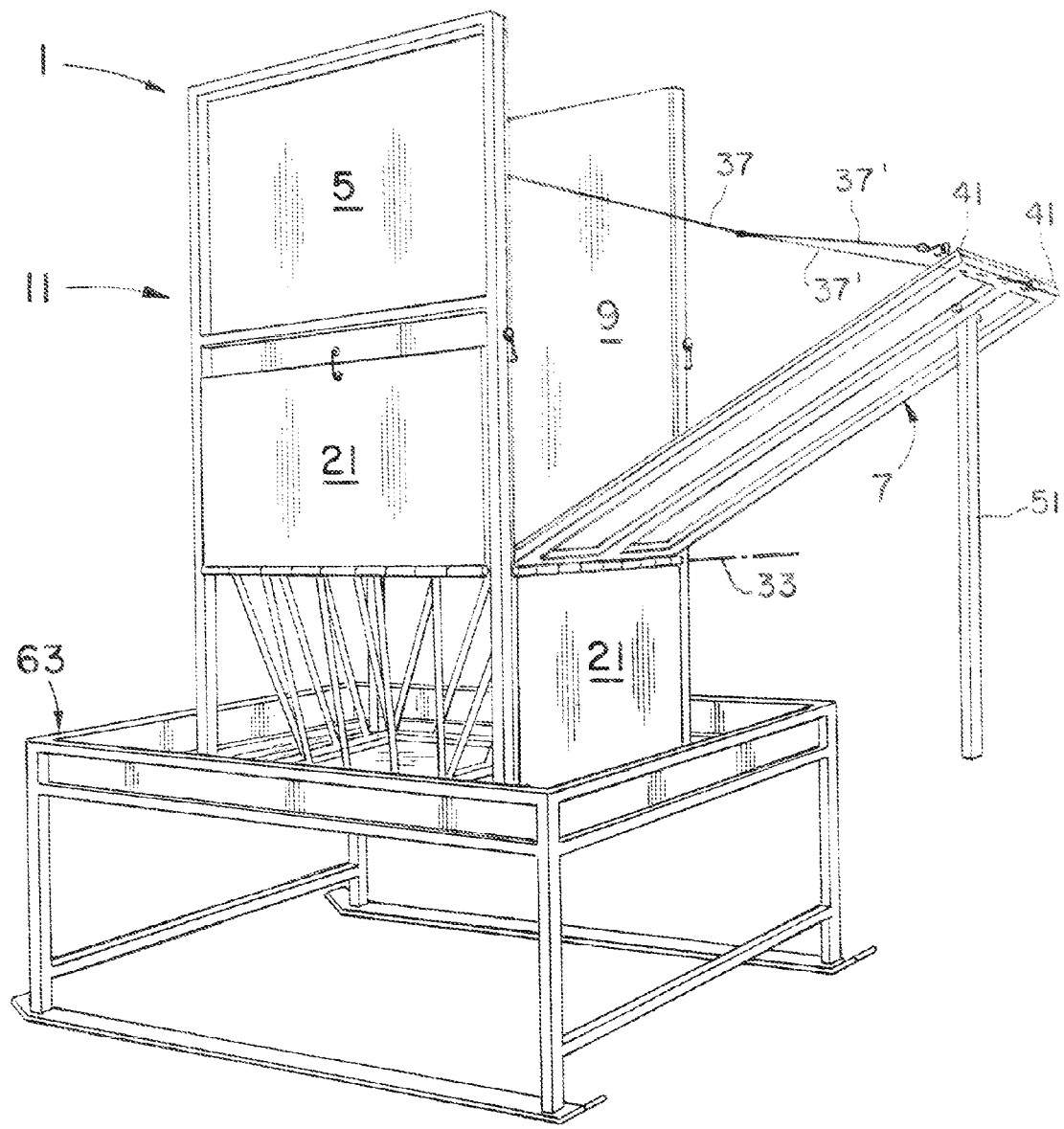

The elongated chute 11 of the hay feeder 1 of FIGS. 1-3 extends along and about a substantially vertical axis 31 (see also FIG. 6a which is a plan view taken along line 6a-6a of FIG. 2). The side members 3, 5, 7, 9 in turn have respective substantially flat or planar interior surfaces 3', 5', 7', 9' (FIG. 6a). The interior surfaces 3', 5', 7', 9' as shown extend along and face inwardly toward the vertical axis 31 and together form the interior of the elongated chute 11. At least one of the side members (e.g., 7 in FIGS. 7-10) is mounted for pivotal movement about a substantially horizontal axis 33 as illustrated from a closed position (FIG. 7) with the interior surface 7' of FIG. 6a extending substantially vertically to a substantially horizontal or open position (FIG. 10) with the interior surface 7' facing upwardly. To assist in lowering the side member 7, the winch or ratchet 35 of FIGS. 1 and 6a is provided on the opposite side member 3 from the pivoting side member 7 of the chute 11 (see FIG. 1). As shown, a cable 37 then runs up from the ratchet 35 in FIG. 1 over the pulley 39 and is attached at its cable end sections 37' (see FIG. 6a) to opposite corner sections 41 of the side member 7 at locations spaced from the pivotal axis 33 (see FIGS. 8-10).

Figure 10:
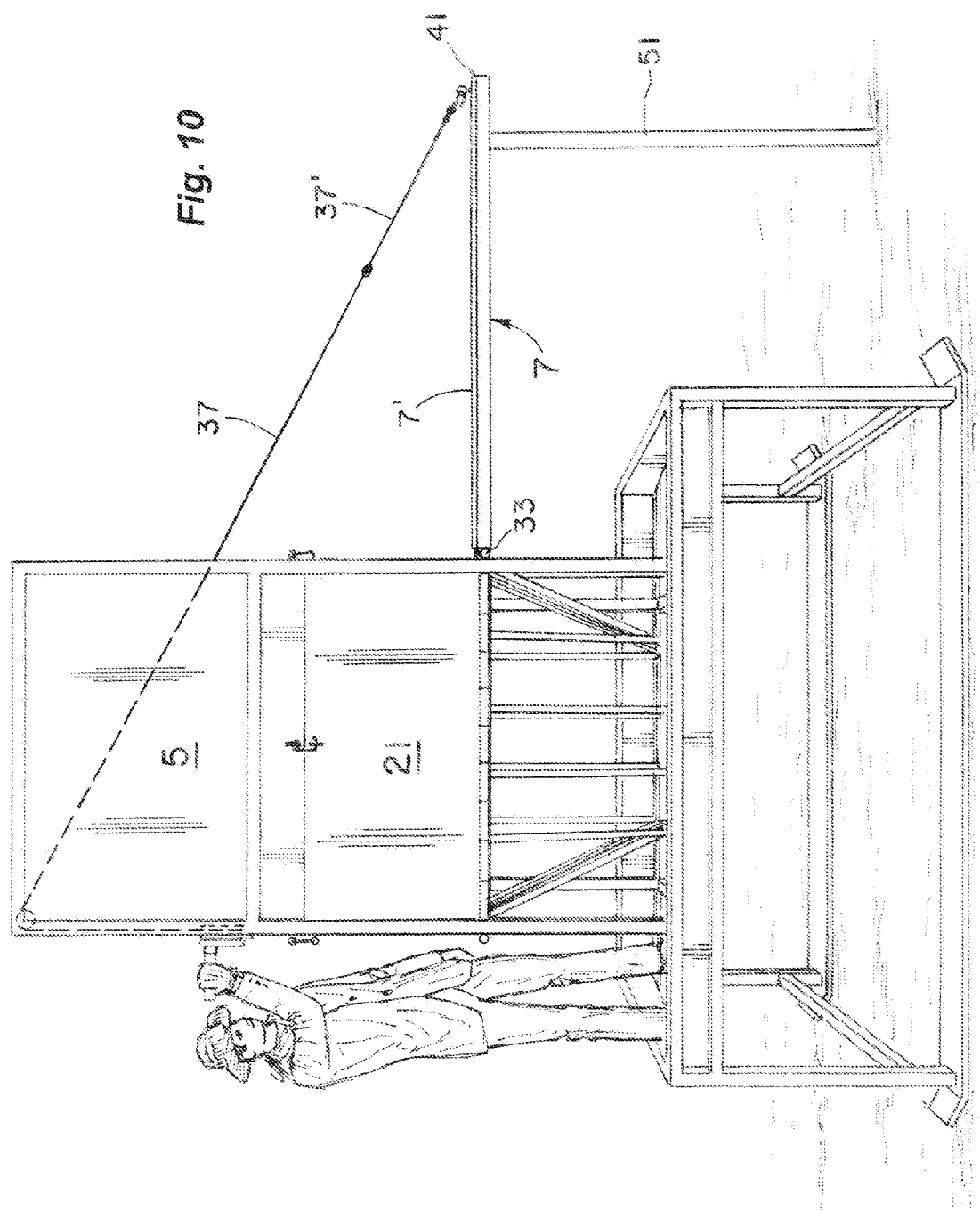
Figure 11:
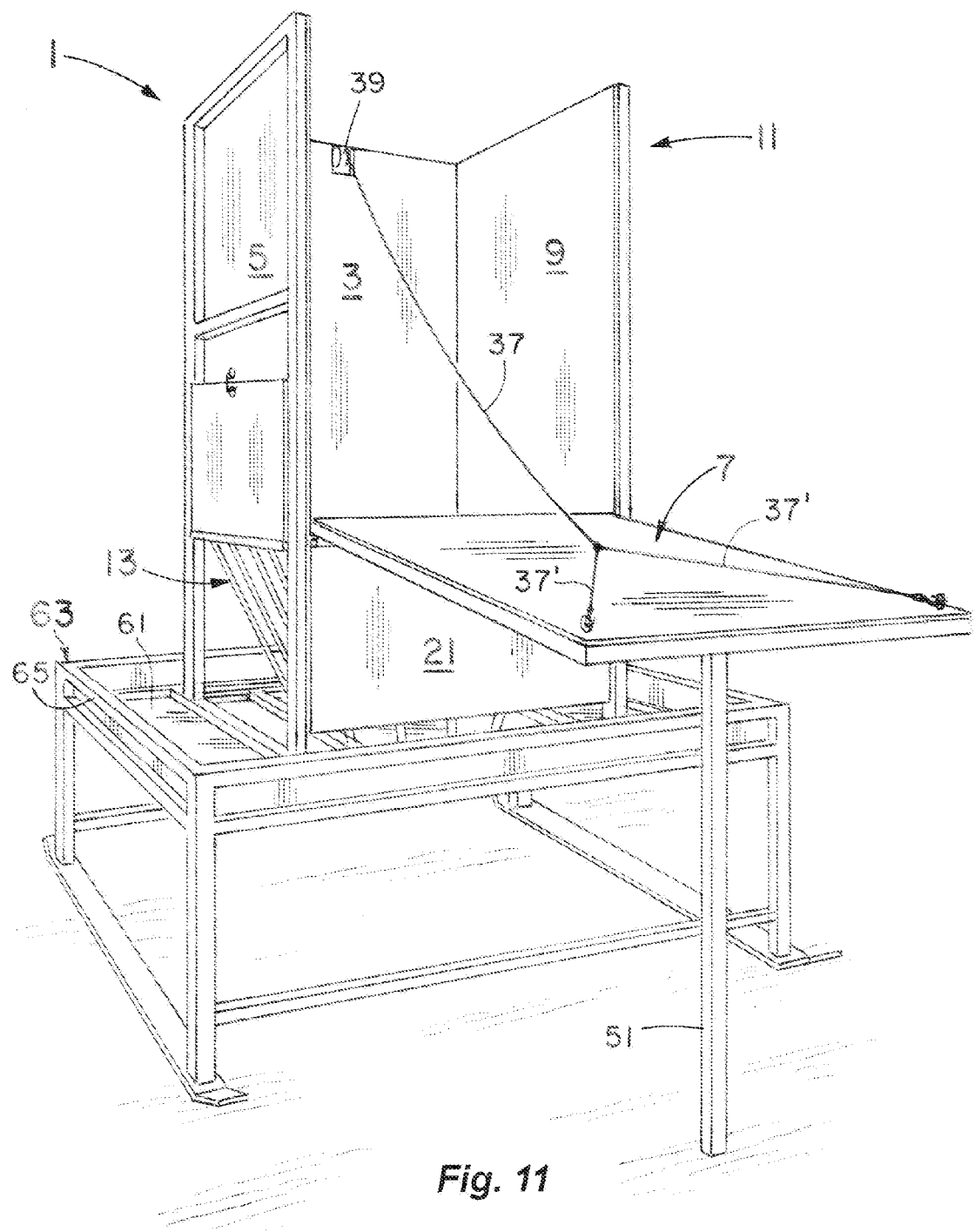
FIG. 11 is a perspective view from the right side of FIG. 10.
Figure 12:
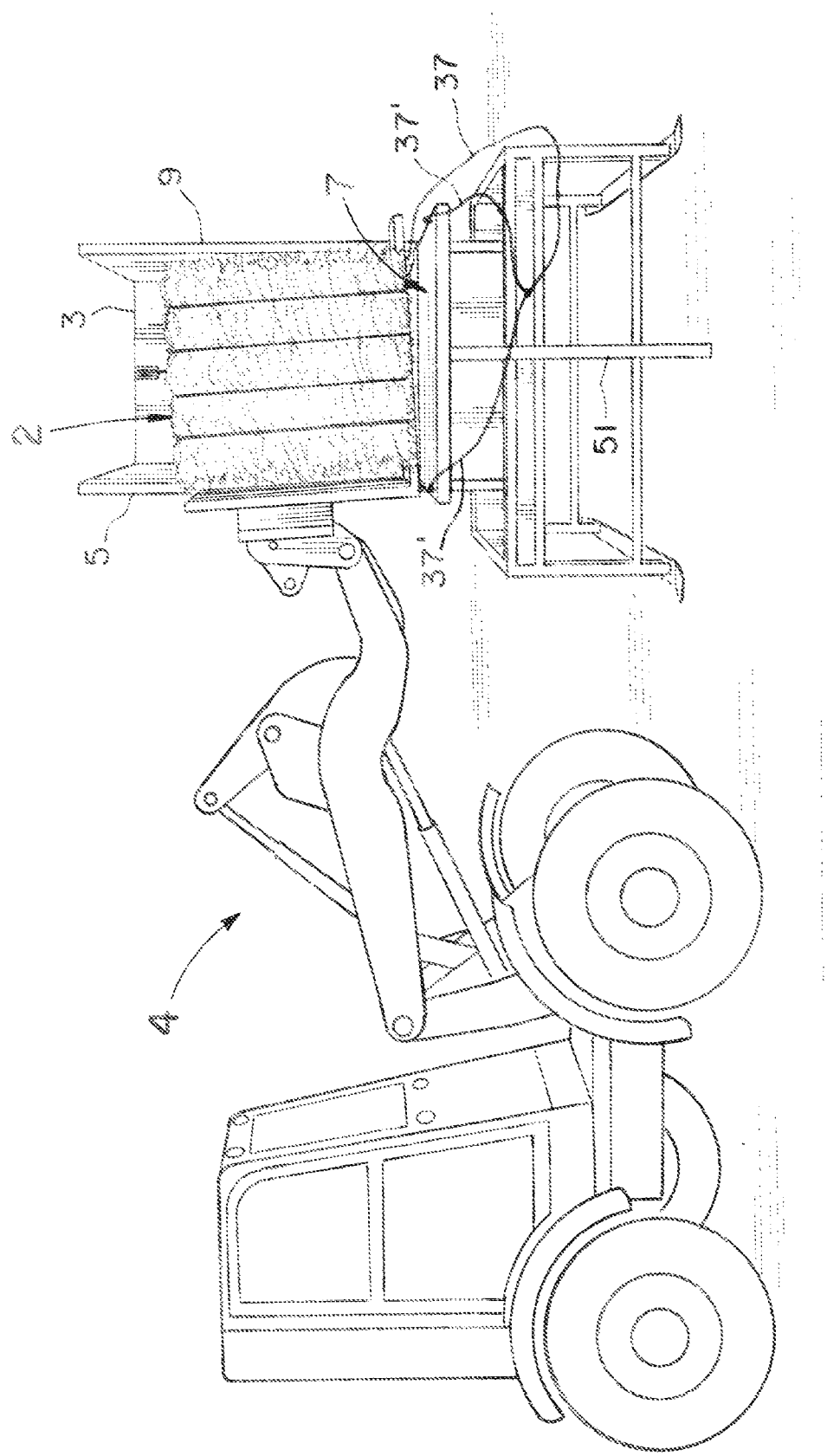
FIG. 12 illustrates a manner in which a large square bale can be loaded onto the lowered side member of the hay feeder.

In one mode of operation and with the side member 7 in its lowered, open position of FIGS. 10-11 with the leg 51 supporting the side member 7 in this open position, the cable 37 and its end sections 37' can be moved or draped to the side of member 7 as in FIG. 12. A large square bale 2 (e.g., 3'×3'×8' weighing on the order of 700-800 pounds) can then be loaded onto the side member 7, the cable 37 and end sections 37' manually positioned about the outer end section 2' of the bale 2 (FIG. 13), and the ratchet 35 operated to draw the bale 2 inwardly along the upper surface 7' of the side member 7 toward the chute 11 to the position of FIG. 14a. In doing so, the cable end sections 37' are positioned as in FIG. 14b over the end section 2' of the bale 2. Continued operation of the ratchet 35 as in FIGS. 15-18 will then lift the side member 7 and bale 2 to place the bale 2 in a substantially vertical position within the elongated chute 11 (FIG. 18).

Figure 13:
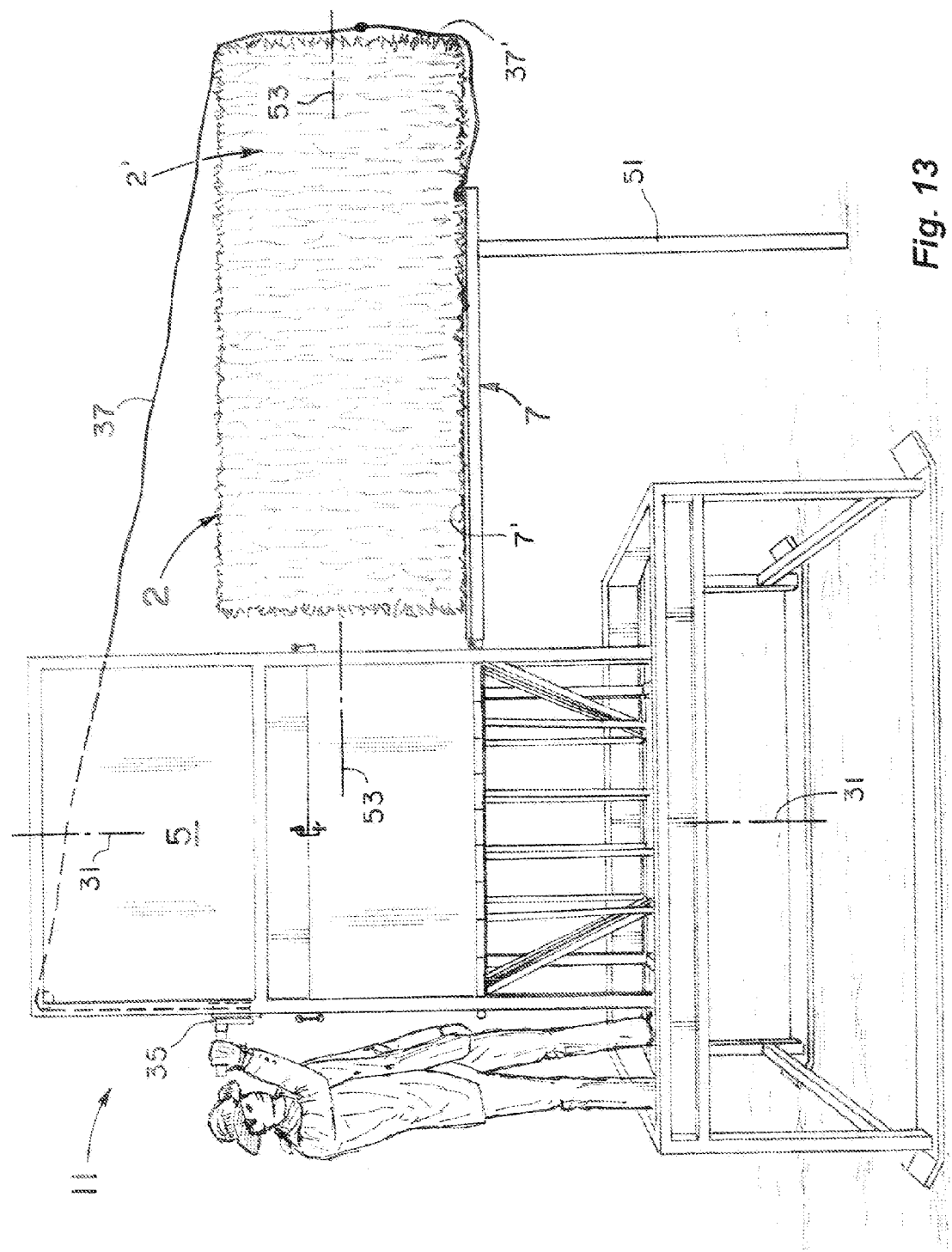
Figure 14B:
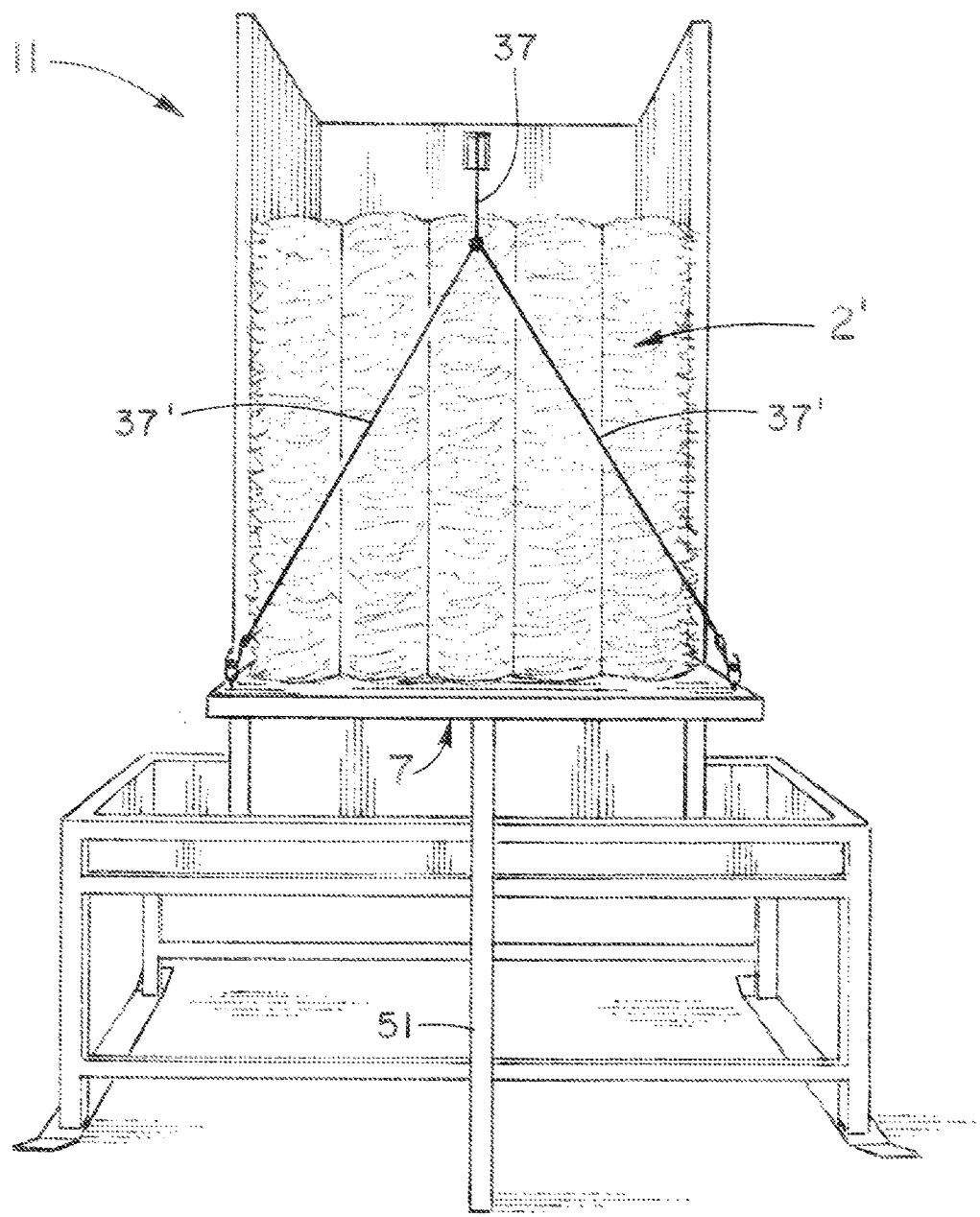

The hay bale 2 in this regard is a large, elongated one (3'×3'×8') with a substantially "square" cross section and extending along an axis 53 (FIGS. 13 and 14a). The cross section substantially perpendicular to the axis 53 can actually vary from a perfect square (e.g., 3'×3' to 3'×4') and still be referred to in the industry as a "square" bale primarily to distinguish it from a round bale. It could also have a larger square cross section (e.g., 4'×4'). In any event and in the position of FIGS. 13 and 14a, the axis 53 of the bale 2 extends substantially horizontally to intersect the substantially vertical axis 31 of the chute 11 wherein the bale 2 is then raised by the lifting arrangement including the ratchet 35 and cable members 37, 37' to the vertical position of FIG. 18 within the chute 11. In this position, the upper and lower end sections of the bale 2 are vertically spaced from each other and the chute axis 31 and bale axis 53 both extend substantially vertically (FIG. 18) to be preferably substantially aligned (e.g., parallel or even collinear) with each other. Also, in this position of FIG. 18 and with the baling wire 12 cut and removed, the lower cover member 21 below the side member 7 can then be pivoted upwardly (see FIG. 5) to provide openings and access by the livestock to all four sides of the lower end section of the chute 11 and lower end section of the bale 2. Alternatively, one or more of the cover members 21 can be lowered to prevent access by the livestock to one or more or all of the sides of the chute 11 and bale 2. The four chute openings and bale side portions in this regard are preferably orthogonal to each other about the respective axes 31, 53 in FIG. 18, Consequently, the cover members 21 can be raised or lowered as desired to control whether the livestock have access for example to adjacent (i.e., perpendicular) or opposite (i.e., parallel) sides of the bale 2 or any combination thereof.

Figure 18:
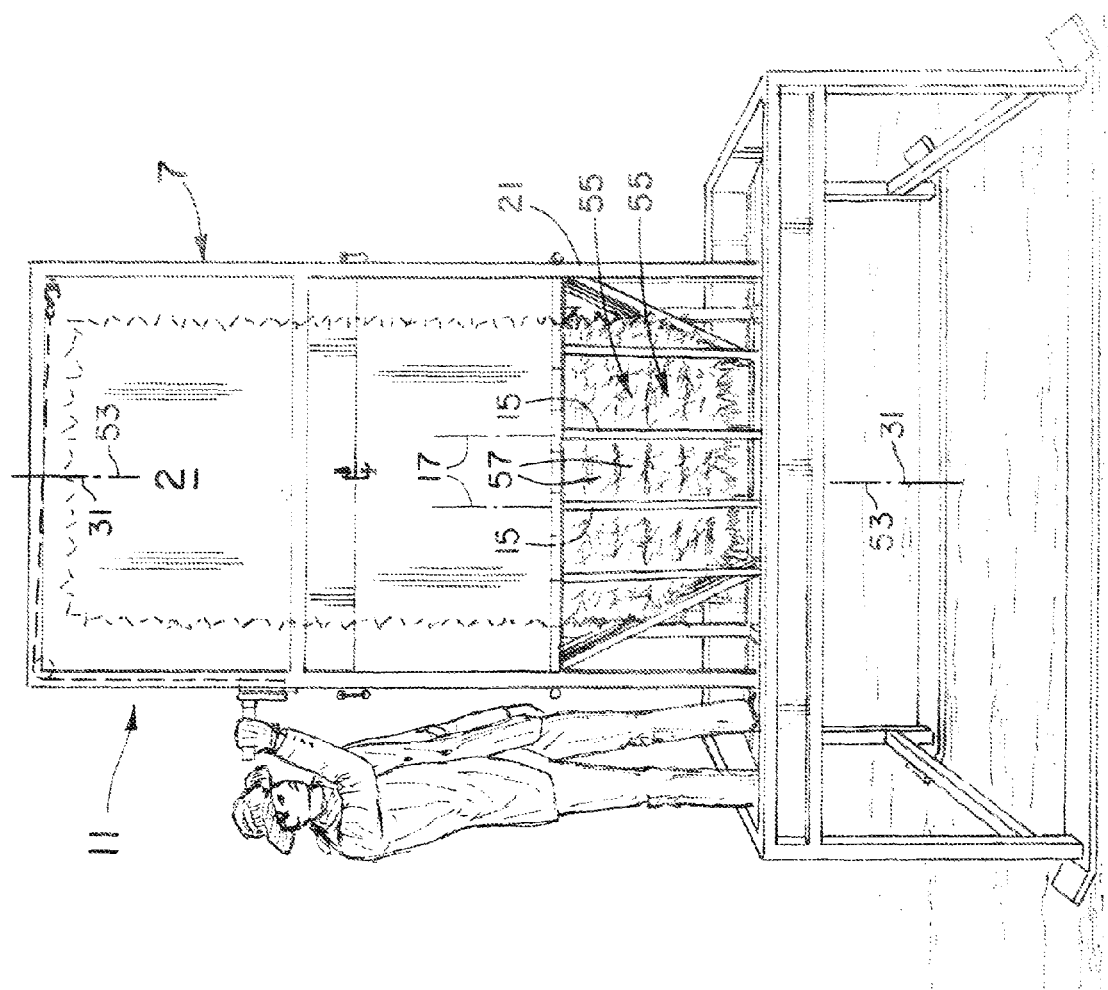

An advantage of the hay feeder 1 of the present invention is that it supports the bale 2 vertically as in FIG. 18. The flakes or slices 55 (e.g., 3'×3'×2") of the bale 2 of FIG. 14a with their substantially flat, short sides 57 are then stacked atop one another (FIG. 18) like slices in a loaf of bread. The flakes 55 of FIG. 18 thus extend with their cross sections (e.g., 3'×3') substantially perpendicular to the bale axis 53. Additionally, the substantially flat, short sides 57 (e.g., 2"-4") of the flakes 55 of the lower end section of the bale 2 in FIG. 18 then extend laterally across one or more of the axes 17 of the grate bars 15. In this manner, the livestock cannot wastefully pull out large chucks or complete flakes 55 of the hay at a time and must work somewhat to remove the hay from the lower end section of the bale 2. This is the case whether the bars 15 are spaced (e.g., 9-10 inches apart) as shown for horses or spaced farther apart for cattle. Also, the lower end section of the chute 11 and grate 13 are supported on the upper surface 61 of the table 63 (see FIGS. 1, 4, and 11). Excess hay pulled out by the livestock will then fall onto the upper table surface 61 (FIG. 11) and not fall onto the ground and be wasted (i.e., not eaten). The surrounding, raised guard rail 65 of the table 63 also enhances this capturing of the excess hay pulled out by the livestock. The table 63 could be on the order of 7'×7' and 30 inches high off the ground with the guard rail 65 about six inches high.

Additionally, the vertical positioning of the bale 2 (FIG. 18) within the elongated chute 11 in combination with the inwardly inclined bars 15 of the grate 13 (FIGS. 4 and 18) serve to inwardly compress the hay which further increases the work the livestock need to do to pull out hay from the exposed, lower end section of the bale 2. This is the case as the livestock initially feed and as the lower end section of the bale 2 is continually being eaten away by them and the bale 2 continually slides downwardly presenting a new lower end section within the grate 13. The side members 3, 5, 7, 9 forming the upper section of the chute 11 in this regard are preferably about six feet high and four feet wide. Consequently, the 4'×4' cross section of the elongated chute 11 formed by the side members is substantially the same size and shape as the cross section of the bale 2 and will substantially support and maintain the bale 2 substantially vertically initially (FIG. 18) and as it is eaten away and slides downwardly. The bars 15 of the grate 13 are downwardly and inwardly inclined in the lower section of the chute 11 from a cross section of about 4'×4' to 2'×2' and in part support the lower end section of the vertical bale 2 within the chute 11. The table top 61 also preferably extends across the lower end section of the chute 11 below the grate 13 (see FIG. 4) and can at least also partially support the lower end section of the bale 2 if necessary. The lower end section of the chute 11 at the grate 13 and the lowered cover members 21 are about two feet high wherein the total height of the chute 11 is then about 8 feet.

Figure 21:
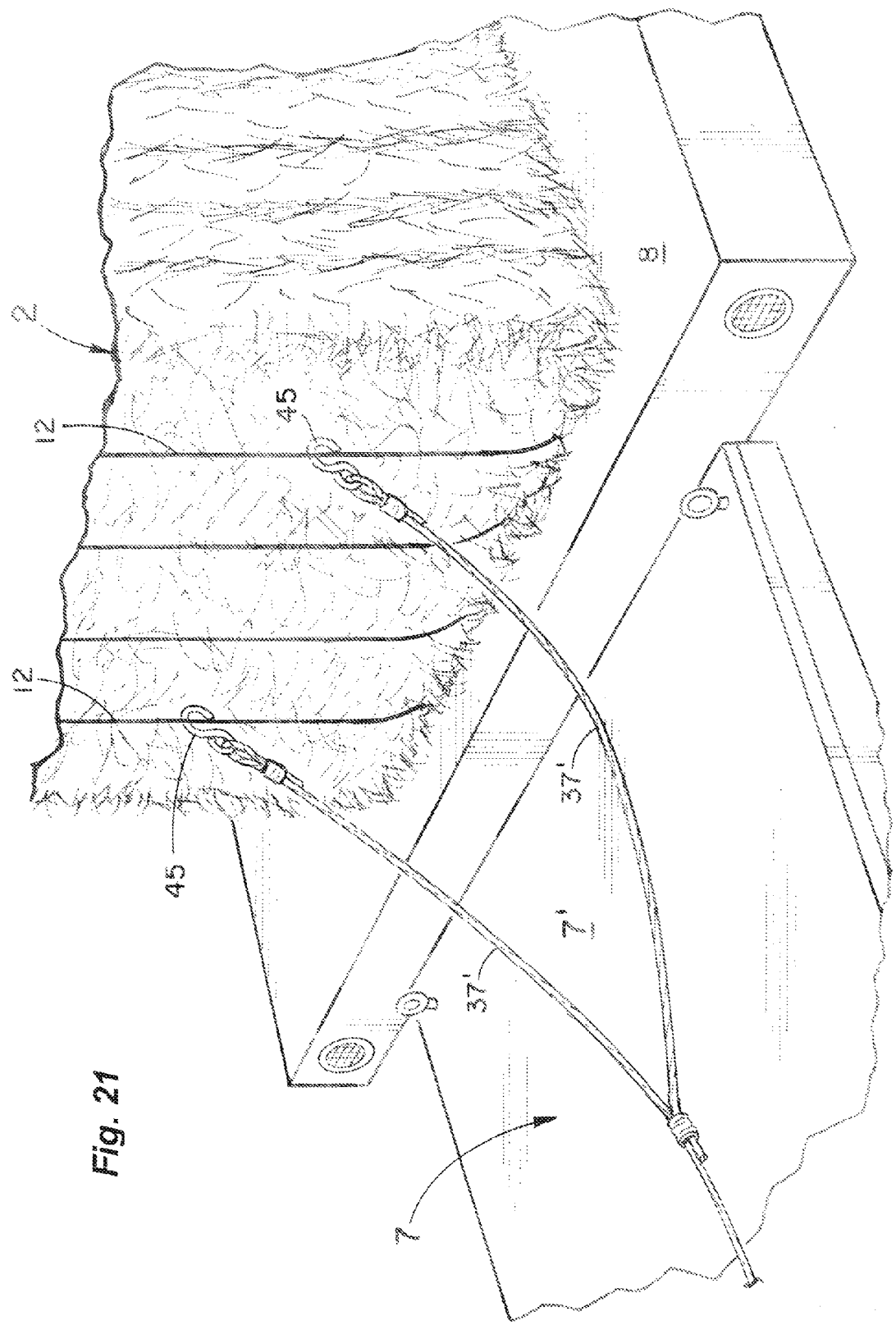
Figure 22:
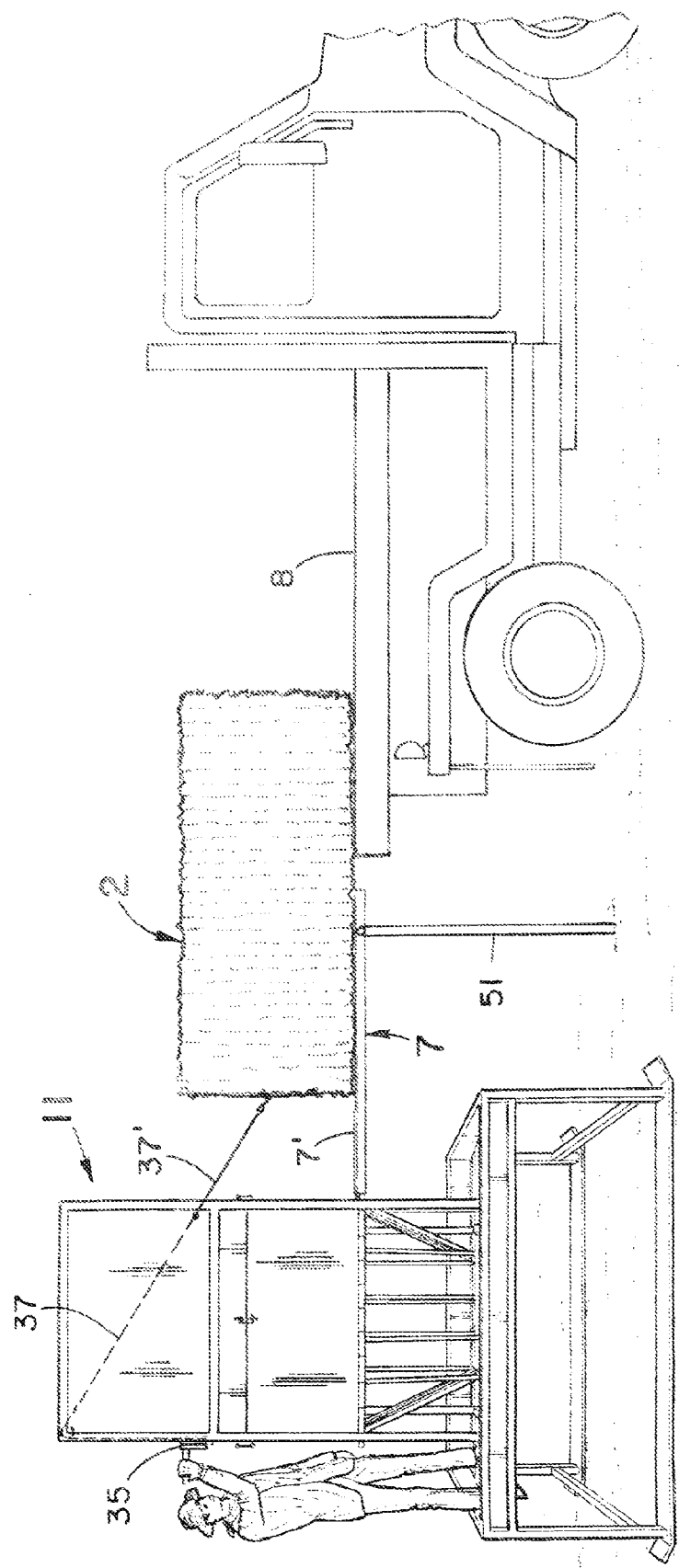
Figure 23:
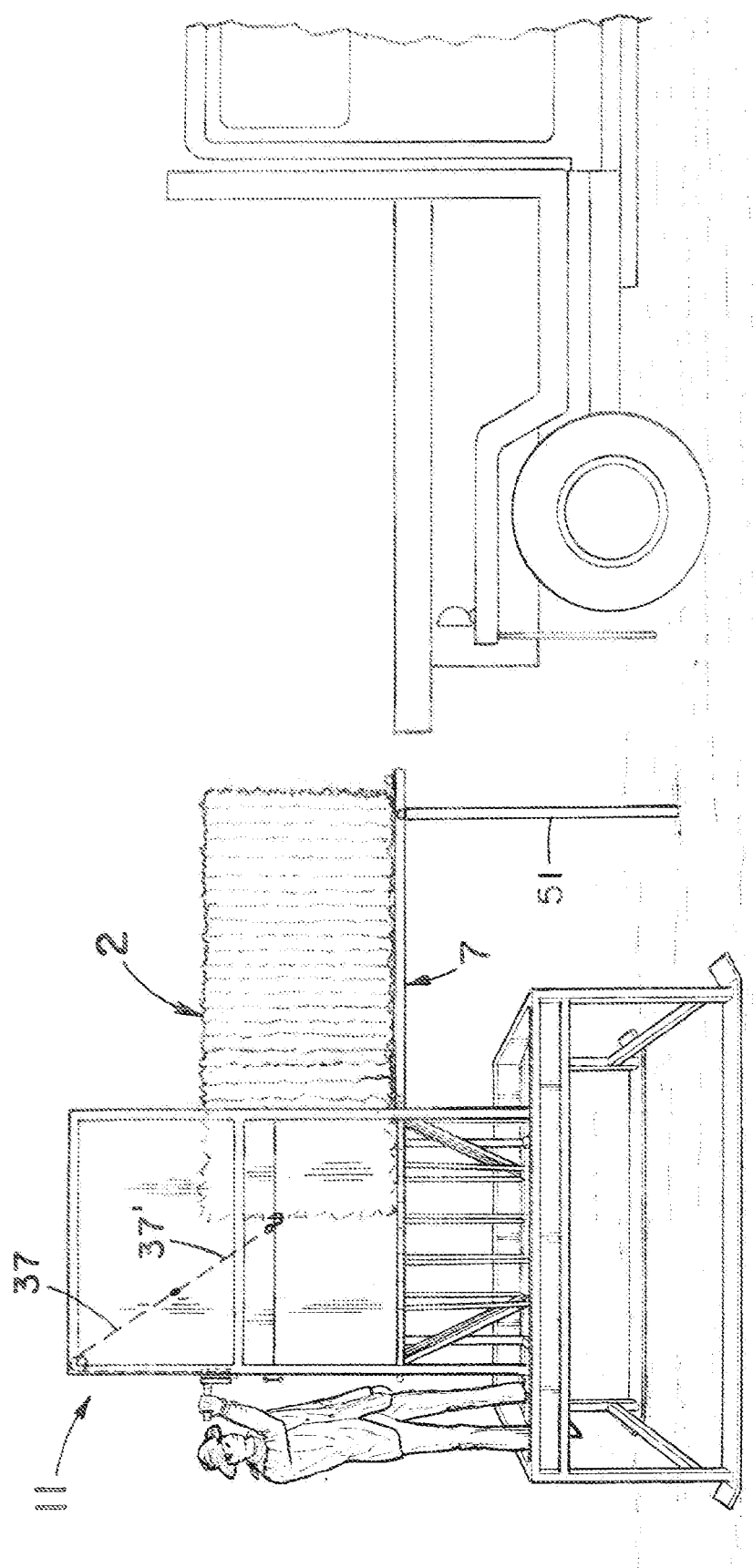
Figure 24:
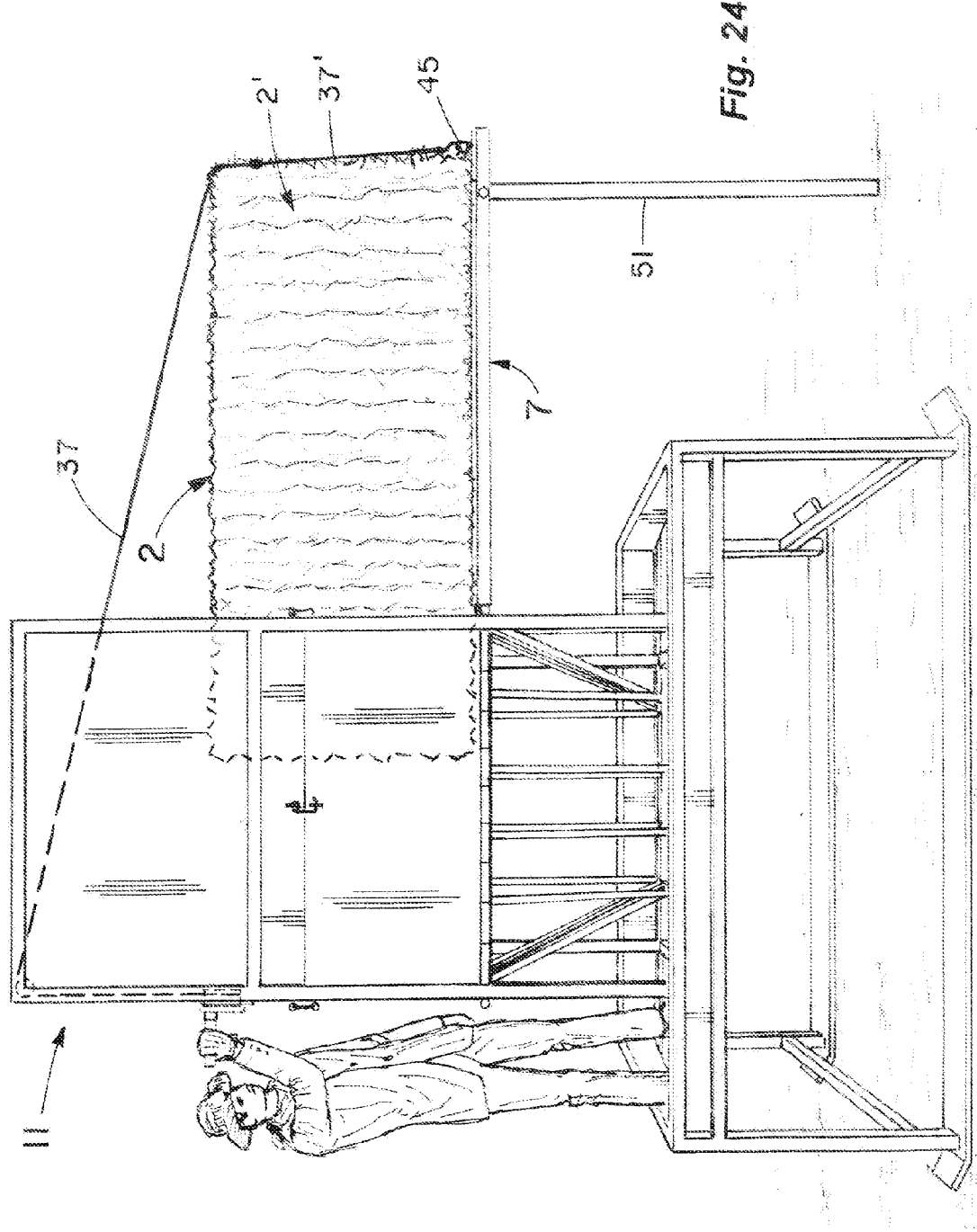
Figure 25:
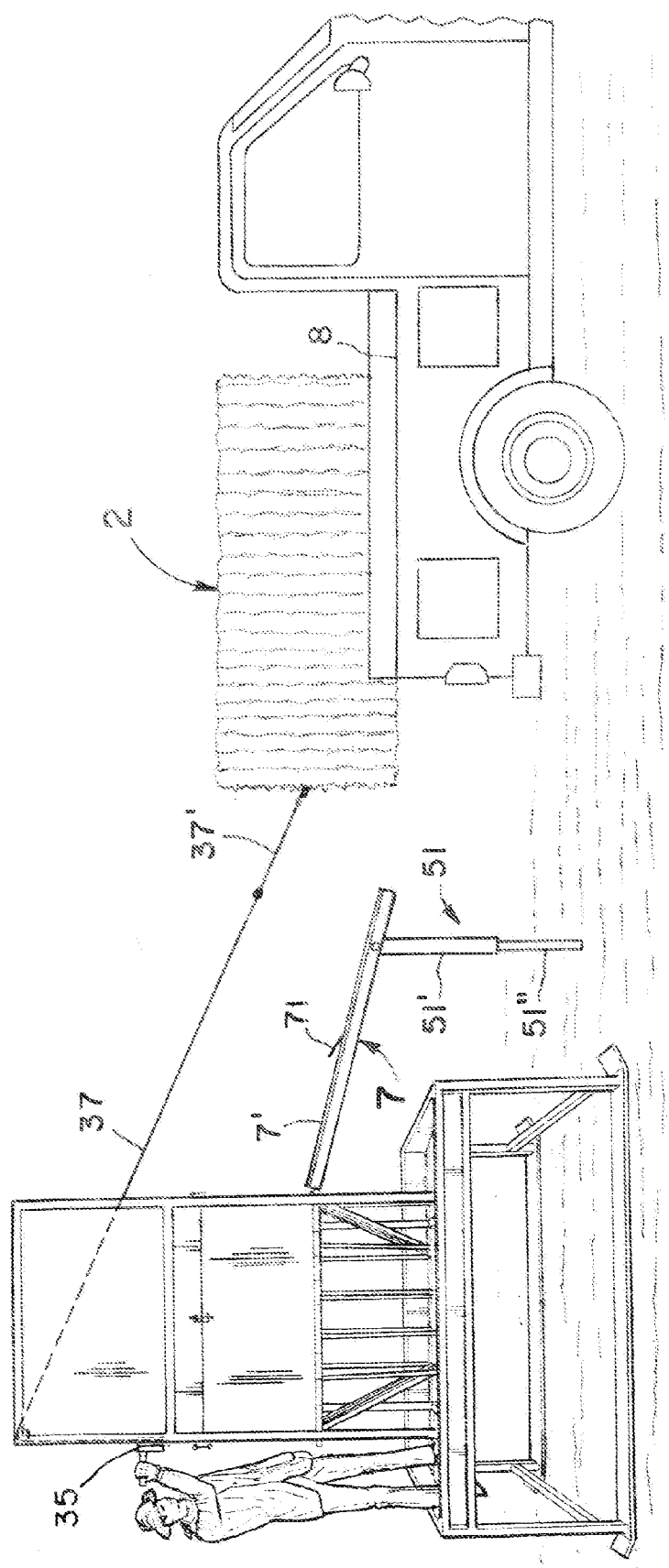
FIGS. 25-29 illustrate another manner in which the hay bale can be loaded onto the lowered side member of the chute when the bed of the pickup truck is significantly lower than the horizontal position of the side member.
Figure 26:
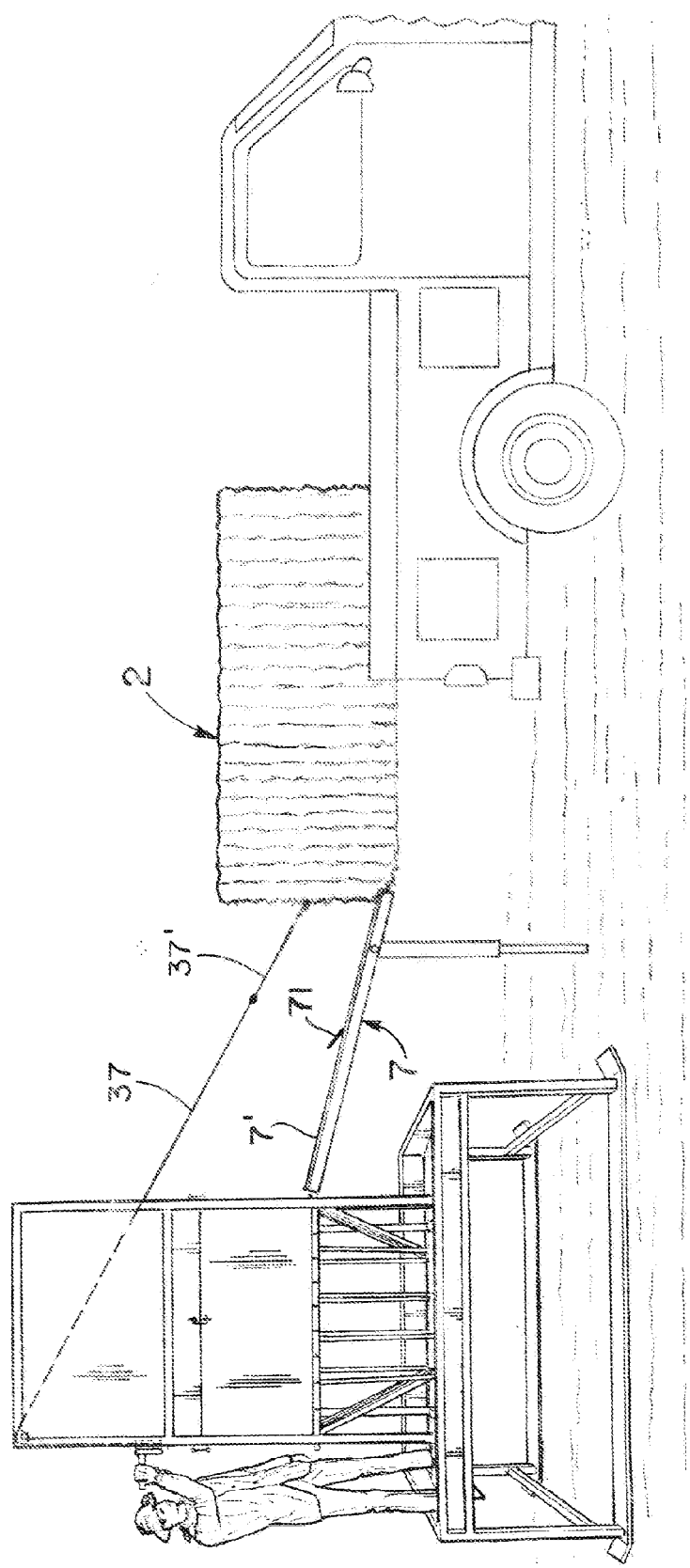
Figure 27:
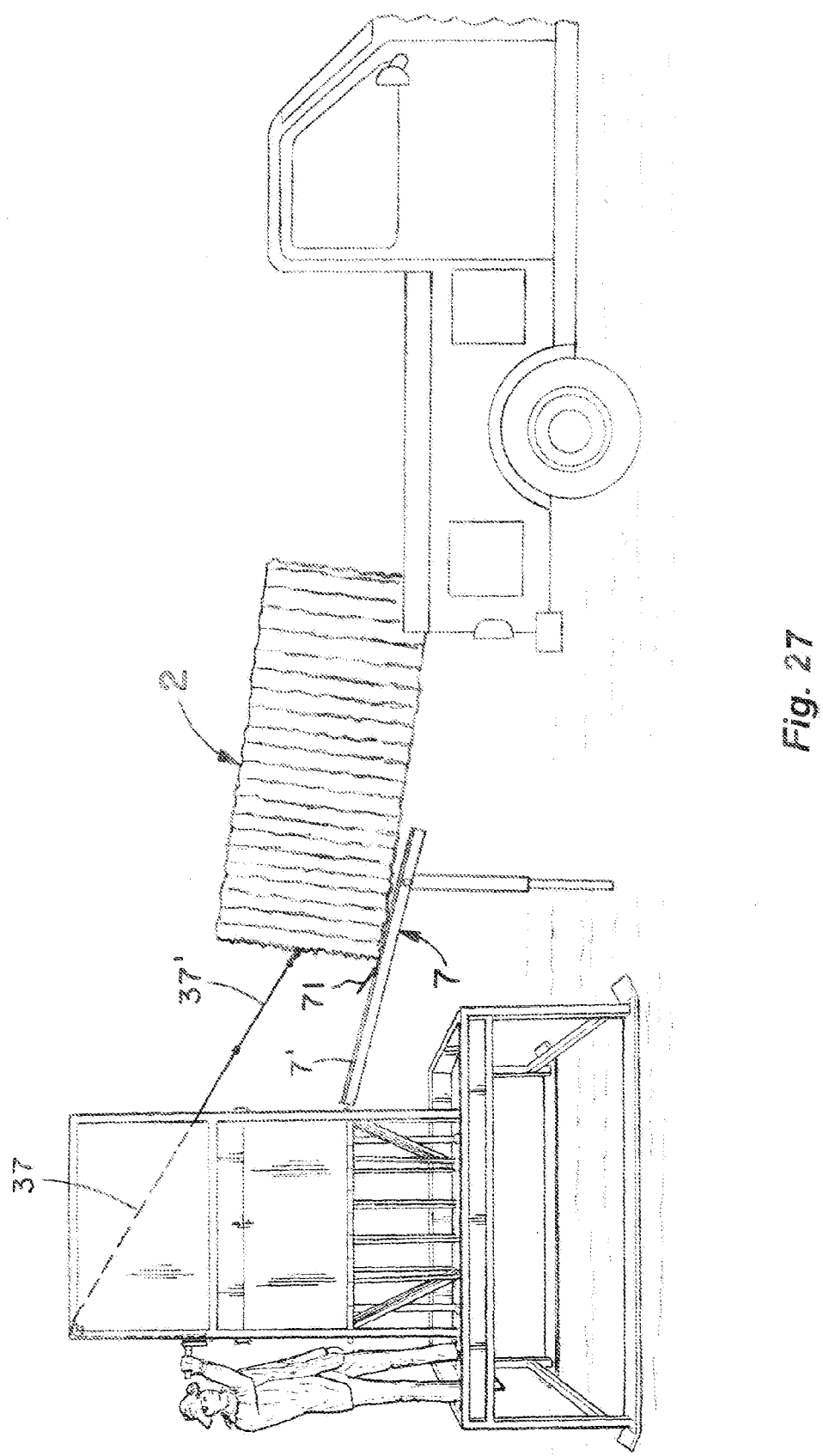
Figure 28:
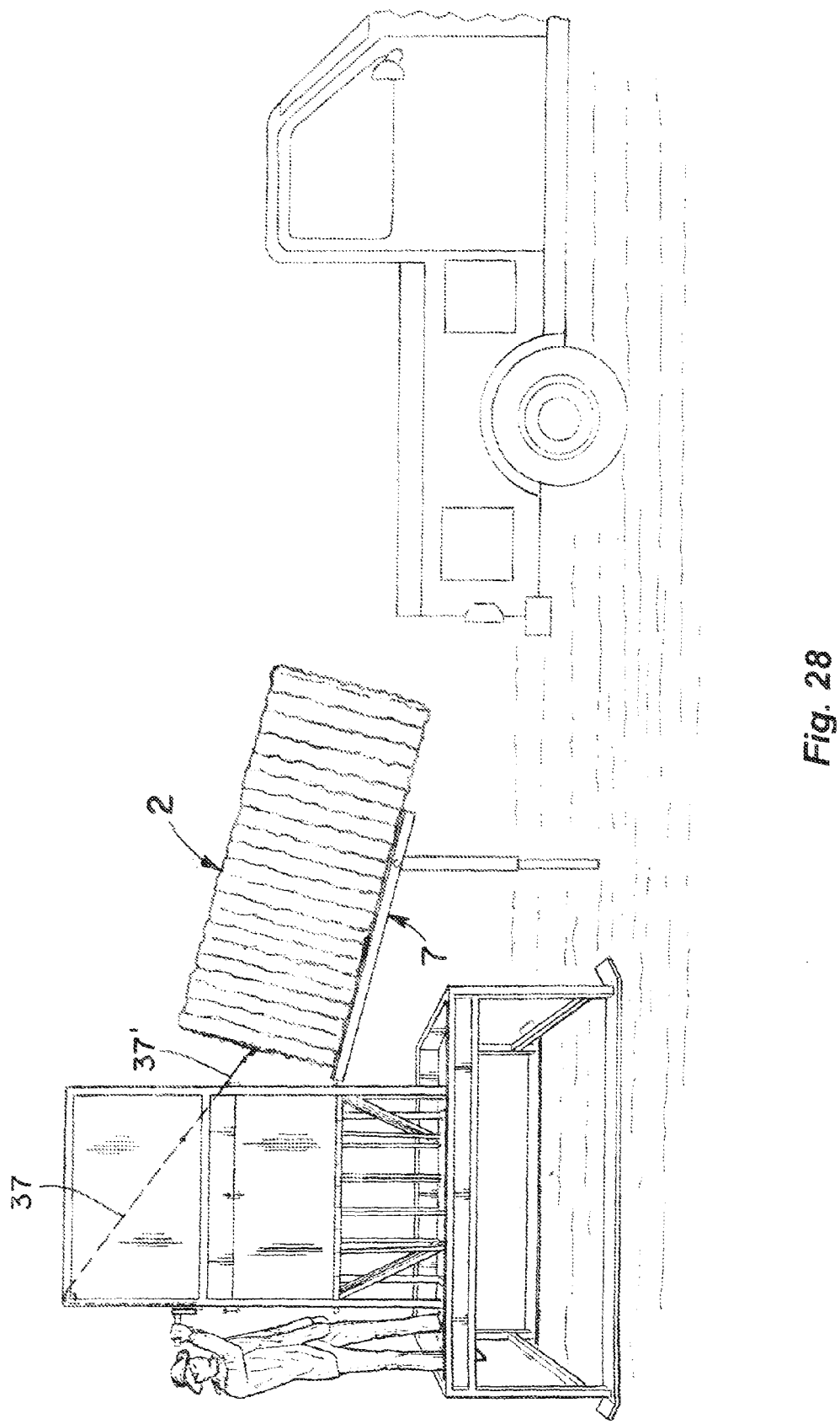
Figure 29:
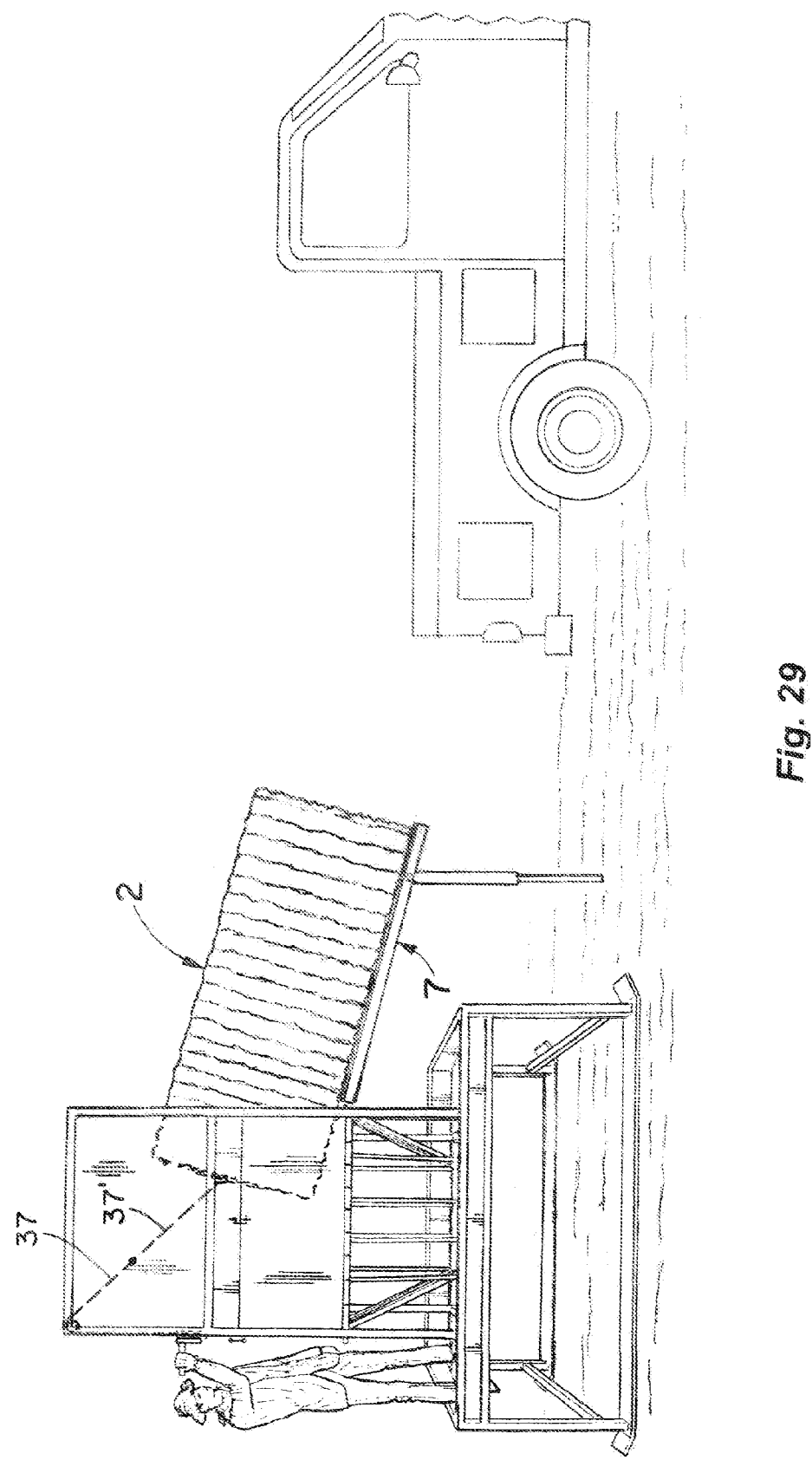

In a second mode of operation that is particularly advantageous to a small and usually busy rancher or horse owner, the hay feeder 1 of the present invention can be loaded without the need of the lifter 4 of FIG. 12. In this mode, the rancher or horse owner can have an individual bale 2 (e.g., 3'×3'×8' weighing on the order of 700-800 pounds) loaded onto the bed 8 of his or her truck 10 at the hay seller's site. The rancher or horse owner can then return to his or her ranch and align the truck 10 as in FIG. 19 with the truck bed 8 substantially even with the lowered side member 7 of the hay feeder 1. The cable end sections 37' can subsequently be unhooked at 45 (see FIG. 20) from the lowered side member 7 and respectively attached to the baling wire 12 of the bale 2 (FIG. 21). Thereafter, the rancher or horse owner can operate the ratchet 35 to pull the bale 2 onto the upper surface 7' of the lowered side member 7 (FIG. 22) toward and into the elongated chute 11 (FIG. 23). The cable end sections 37' can subsequently be unhooked from the baling wire 12 and re-hooked over the end section of the bale 2 to the side member 7 at 45 as in FIG. 24. From this position, the sequence of FIGS. 14a-18 can then be repeated to lift and load the elongated bale 2 into the chute 11.

In yet another mode of operation and should it not be possible to horizontally align the truck bed 8 with the horizontally extending side member 7 (see FIG. 25), the support leg 51 (which is preferably telescoping with segments 51', 51") can be vertically collapsed as shown to further lower the side member 7 below the horizontal. Thereafter and with the cable end sections 37' respectively attached to the baling wire 12 of the bale 2 as in FIG. 21, the ratchet 35 can be operated to pull the bale 2 onto and up the inclined side member 7 (FIGS. 25-29). From there, the cable end sections 37' can be detached or unhooked from the baling wire and re-hooked over the end section 2' of the bale 2 to the side member 7 as in FIG. 24 and the ratchet 35 operated as in FIGS. 14a-18 to load the bale 2 into the chute 11. To assist in this mode of operation and prevent the bale 2 from sliding downwardly on the inclined side member 7 of FIG. 29 as the cable end sections 37' are unhooked from the bailing wire and re-hooked over the bale 2 to the side member 7, one or more one-way, spring-biased catches 71 (FIGS. 25-27) can be provided on the surface 7' of the side member 7.

Figure 30:
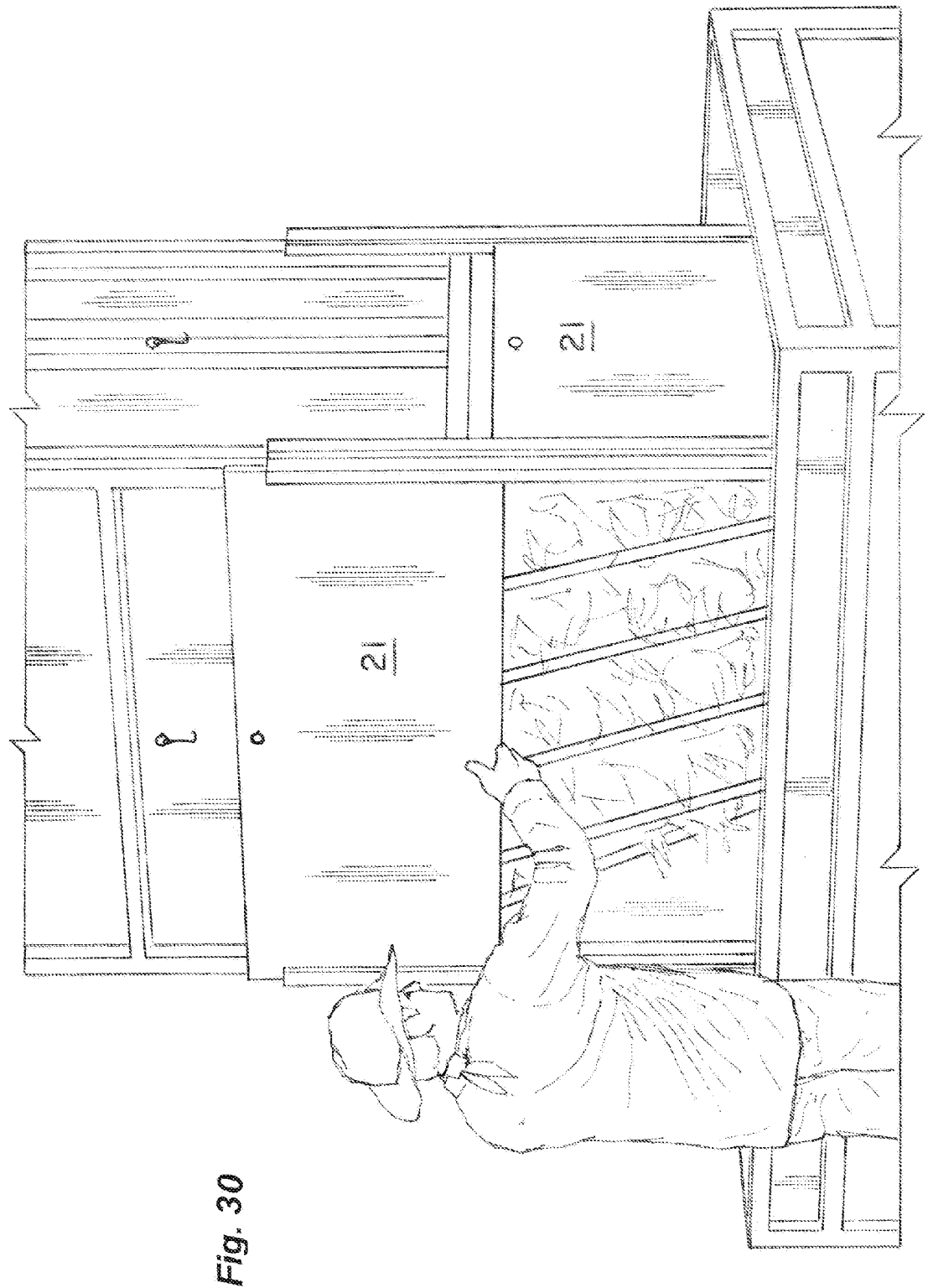
FIG. 30 is a view of the cover members for selectively permitting and preventing access to the lower end section of the chute and the grate in the lower section of the chute in which the cover members are slidingly rather than pivotally mounted as in FIG. 5.
Figure 31:
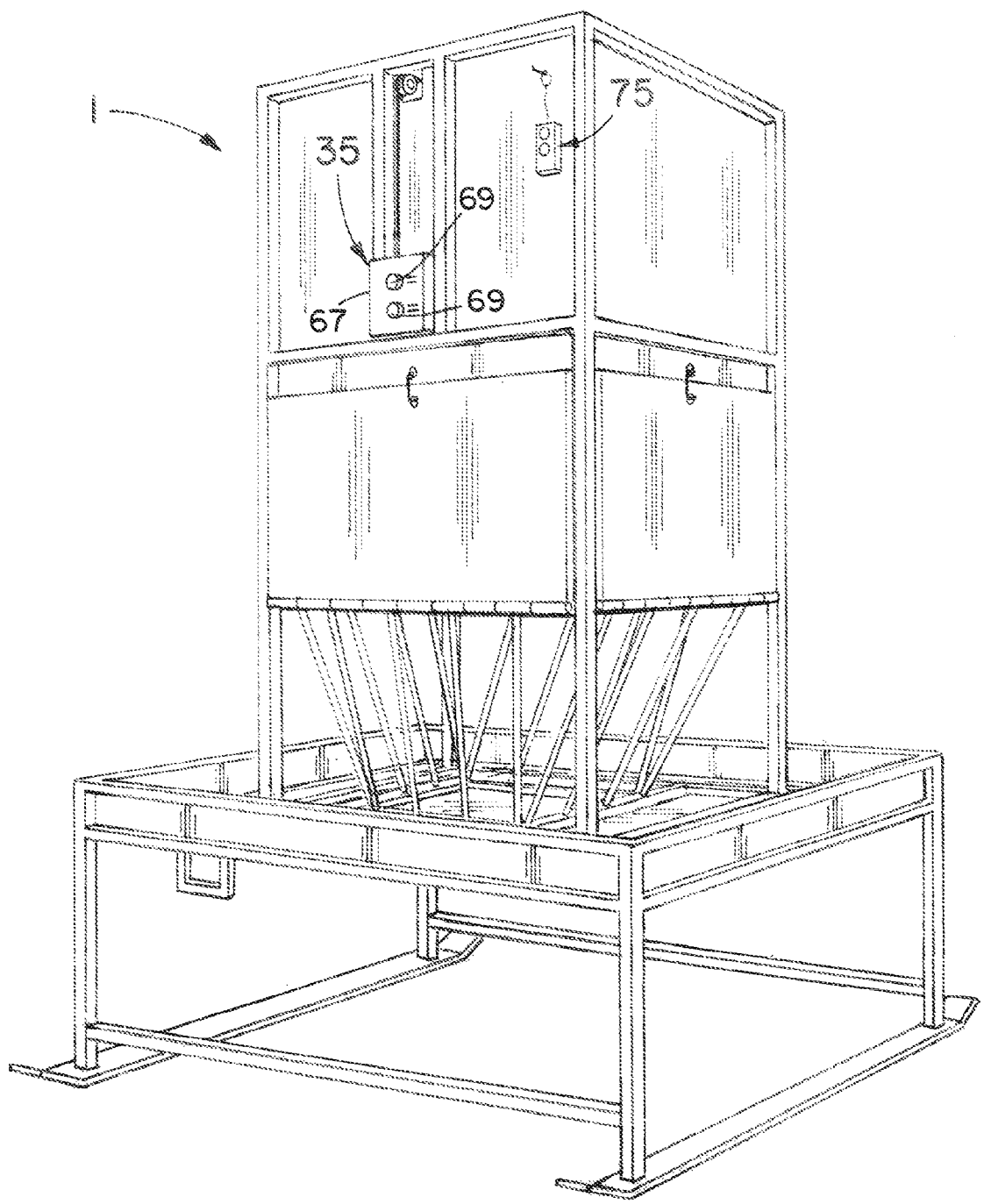
FIG. 31 illustrates another embodiment of the lifting arrangement for the pivoting side member in which it is motor driven and can be directly or remotely controlled if desired.

The support leg 51 of FIGS. 25-29 could be telescoping in the earlier embodiments as well to aid in the operation of the hay feeder 1 on uneven ground or where the truck bed 8 and lowered side member 7 do not quite align horizontally. Regardless, the leg 51 will pivot outwardly of the side member 7 (FIGS. 7-10) about a substantially horizontal axis 73 (FIGS. 7-8) as side member 7 is lowered and upwardly to substantially abut the exterior surface of the side member 7 (FIG. 7) when the side member 7 is raised back to its vertical position. Also, the member 37 with its end sections 37' is described for convenience as being a cable but it could be any elongated member that was strong enough to raise the side member 7 with the bale 2 on it into the chute 11. The cover members 21 are also illustrated as being pivotally mounted but could be mounted to be slide up and down as in FIG. 30. Further, the ratchet 35 of the hay feeder 1 is shown as being manually operated but it could be motor driven as in FIG. 31 with the motor 67 controlled at 69 adjacent the motor 67 and/or by a removable and wireless remote 75.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute capable of receiving an elongated bale of hay therein having a substantially square cross section and extending along a longitudinal axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly and capable of receiving an elongated hay bale on at least said portion of the surface of said one side member in said second, open position with a longitudinal axis of an elongated hay bale extending substantially horizontally, and a lifting arrangement capable of raising said one side member with an elongated hay bale positionable thereon from said second, open position to said first, closed position to raise an elongated hay bale positionable thereon to a substantially vertical position within said elongated chute with a longitudinal axis of an elongated hay bale positionable therein extending substantially vertically to be substantially aligned with the first, vertical axis of said elongated chute, said elongated chute with the one side member of said elongated chute in said first, closed position with an elongated hay bale positionable within the elongated chute having upper and lower end sections vertically spaced from each other, the lower end section of said elongated chute having at least one opening to provide access therethrough to the lower end section of the elongated chute with an elongated hay bale positionable therein and wherein the one opening in the lower end section of the elongated chute provides access therethrough to a first portion of the lower end section of the elongated chute with an elongated hay bale positionable therein and wherein the lower end section of the elongated chute has at least a second opening spaced from the first opening about said first, vertical axis to provide access therethrough to a second portion of the lower end section of the elongated chute with an elongated hay bale positionable therein, said second portion being spaced from the first portion of the lower end section of the elongated chute about the first axis of the elongated chute.

2. The hay feeder of claim 1 wherein said first and second openings in the elongated chute are substantially adjacent and perpendicular to each other to respectively provide access therethrough to the interior of the elongated chute with an elongated hay bale positionable therein.

3. The hay feeder of claim 1 wherein said first and second openings in the elongated chute are substantially opposite to and facing each other to respectively provide access therethrough to the interior of the elongated chute with an elongated hay bale positionable therein.

4. The hay feeder of claim 1 wherein the lower end section of the elongated chute has at least third and fourth openings spaced from each other about the first, vertical axis and each other with each of the four openings respectively providing access therethrough to the interior of the elongated chute with an elongated hay bale positionable therein.

5. The hay feeder of claim 4 further including respective members selectively positionable to cover and uncover the respective four openings in the lower end section of the elongated chute to selectively provide and prevent access therethrough to the interior of the elongated chute with an elongated hay bale positionable therein.

6. The hay feeder of claim 5 further including a grate of bars inclined downwardly and inwardly in the lower end section of the elongated chute adjacent each of said openings.

7. The hay feeder of claim 6 further including a table member with a top surface, said elongated chute being positionable atop the table member with the top surface of the table member at least in part extending across the lower end section of the elongated chute below said grate to close off the lower end section of the elongated chute with an elongated hay bale positionable therein.

8. The hay feeder of claim 4 further including a grate of bars inclined downwardly and inwardly in the lower end section of the elongated chute adjacent each of said openings.

9. The hay feeder of claim 8 further including a table member with a top surface, said elongated chute being positionable atop the table member with the top surface of the table member at least in part extending across the lower end section of the elongated chute below said grates with an elongated hay bale positionable therein.

10. The hay feeder of claim 1 wherein said elongated chute has at least four side members.

11. The hay feeder of claim 1 wherein said elongated chute has at least four side members with respective substantially flat, interior surfaces.

12. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute to receive an elongated bale of hay therein having a substantially square cross section and extending along a second axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, said elongated hay bale being positionable on at least said portion of the surface of said one side member in said second, open position with the second axis of the elongated hay bale extending substantially horizontally, and a lifting arrangement to raise said one side member with the elongated hay bale thereon from said second, open position to said first, closed position to raise said elongated hay bale to a substantially vertical position within said elongated chute with the second axis of said elongated hay bale extending substantially vertically to be substantially aligned with the first, vertical axis of said elongated chute, said elongated chute and said elongated hay bale with the one side member of said elongated chute in said first, closed position and the elongated hay bale positioned within the elongated chute respectively having upper and lower end sections vertically spaced from each other, the lower end section of said elongated chute having at least one opening to provide access therethrough to the lower end section of the elongated hay bale within said elongated chute, said hay feeder further including a grate having a plurality of bars extending along respective axes in the lower end section of the elongated chute adjacent at least the one opening wherein said elongated hay bale is composed of a plurality of flakes with substantially square cross sections substantially perpendicular to the second axis of the elongated hay bale and having substantially flat, short sides extending along and about the second axis of the elongated hay bale, the flakes with the elongated hay bale extending vertically within said elongated chute being stacked atop one another with the respective flat sides of the lower end section of the elongated hay bale extending substantially laterally across the axis of at least one of said bars.

13. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute with the elongated chute adapted to receive an elongated bale of hay therein having a substantially square cross section and extending along an axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, and a lifting arrangement to raise said one side member from said second, open position to said first, closed position, said elongated chute with the one side member of said elongated chute in said first, closed position having upper and lower end sections vertically spaced from each other, the lower end section of said elongated chute having at least one opening to provide access therethrough to the interior of the elongated chute wherein said one side member has an exterior surface opposite the interior surface and facing downwardly with the one side member in said second, open position, said hay feeder further including at least one support leg mounted for pivotal movement about a substantially horizontal axis adjacent the exterior surface of the one side member, said interior and exterior surfaces of said one side member in said second, open position extending substantially horizontally and spaced above the ground, said support leg extending substantially along a vertical axis between the one side member and the ground with the one side member in said second, open position to support and maintain said one side member in said second, open position.

14. The hay feeder of claim 13 wherein said support leg is free to pivot to a position substantially adjacent the one side member with the one side member in said first, closed position.

15. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute to receive an elongated bale of hay therein having a substantially square cross section and extending along a second axis,
   at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, said elongated hay bale being positionable on at least said portion of the surface of said one side member in said second, open position with the second axis of the elongated hay bale extending substantially horizontally, and a lifting arrangement to raise said one side member with the elongated hay bale thereon from said second, open position to said first, closed position to raise said elongated hay bale to a substantially vertical position within said elongated chute with the second axis of said elongated hay bale extending substantially vertically to be substantially aligned with the first, vertical axis of said elongated chute,
   said elongated chute and said elongated hay bale with the one side member of said elongated chute in said first, closed position and the elongated hay bale positioned within the elongated chute respectively having upper and lower end sections vertically spaced from each other, the lower end section of said elongated chute having at least one opening to provide access therethrough to the lower end section of the elongated hay bale within said elongated chute wherein the second axis of the elongated hay bale is substantially perpendicular to said first axis with the one side member in said second, open position.

16. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute to receive an elongated bale of hay therein having a substantially square cross section and extending along a second axis,
   at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, said elongated hay bale being positionable on at least said portion of the surface of said one side member in said second, open position with the second axis of the elongated hay bale extending substantially horizontally, and a lifting arrangement to raise said one side member with the elongated hay bale thereon from said second, open position to said first, closed position to raise said elongated hay bale to a substantially vertical position within said elongated chute with the second axis of said elongated hay bale extending substantially vertically to be substantially aligned with the first, vertical axis of said elongated chute,
   said elongated chute and said elongated hay bale with the one side member of said elongated chute in said first, closed position and the elongated hay bale positioned within the elongated chute respectively having upper and lower end sections vertically spaced from each other, the lower end section of said elongated chute having at least one opening to provide access therethrough to the lower end section of the elongated hay bale within said elongated chute wherein the second axis of the elongated hay bale substantially intersects the first axis with the one side member in said second, open position.

17. The hay feeder of claim 16 wherein said lift arrangement includes at least one cable member with an end section selectively attachable to the one side member at a location spaced from the horizontal axis thereof and selectively detachable therefrom, said elongated hay bale having at least one binding member extending thereabout wherein said end section of the cable member can be detached from the one side member and secured to said binding member of said elongated hay bale and said lifting arrangement operated to pull the elongated hay bale onto and along at least said portion of the interior surface of the one side member in said third position toward the first, vertical axis of said elongated chute.

18. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute with the elongated chute adapted to receive an elongated bale of hay therein having a substantially square cross section and extending along an axis,
   at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, and a lifting arrangement to raise said one side member from said second, open position to said first, closed position,
   said elongated chute with the one side member of said elongated chute in said first, closed position having upper and lower end sections vertically spaced from each other, the lower end section of said elongated chute having at least one opening to provide access therethrough to the interior of the elongated chute wherein said lift arrangement includes a ratchet and at least one cable member extending from the ratchet to the one side member and being selectively attachable to said one side member at a location spaced from said horizontal pivotal axis.

19. The hay feeder of claim 18 wherein said ratchet is manually operable.

20. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute with the elongated chute adapted to receive an elongated bale of hay therein having a substantially square cross section and extending along an axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, and a lifting arrangement to raise said one side member from said second, open position to said first, closed position, said elongated chute with the one side member of said elongated chute in said first, closed position having upper and lower end sections vertically spaced from each other, the lower end section of said elongated chute having at least one opening to provide access therethrough to the interior of the elongated chute wherein said lift arrangement includes a motor selectively operable to raise and lower the one side member between said second, open position and said first, closed position.

21. The hay feeder of claim 20 wherein said motor is remotely operable by a wireless control.

22. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute to receive an elongated bale of hay therein having a substantially square cross section and extending along a second axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, said elongated hay bale being positionable on at least said portion of the surface of said one side member in said second, open position with the second axis of the elongated hay bale extending substantially horizontally, and a lifting arrangement to raise said one side member with the elongated hay bale thereon from said second, open position to said first, closed position to raise said elongated hay bale to a substantially vertical position within said elongated chute with the second axis of said elongated hay bale extending substantially vertically to be substantially aligned with the first, vertical axis of said elongated chute, said elongated chute and said elongated hay bale with the one side member of said elongated chute in said first, closed position and the elongated hay bale positioned within the elongated chute respectively having upper and lower end sections vertically spaced from each other, the lower end section of said elongated chute having at least one opening to provide access therethrough to the lower end section of the elongated hay bale within said elongated chute wherein at least said portion of the interior surface of the one side member extends substantially horizontally in said second, open position and said lift arrangement includes at least one cable member with an end section selectively attachable to the one side member at a location spaced from the horizontal axis thereof and selectively detachable therefrom, said elongated hay bale having at least one binding member extending thereabout wherein said end section of the cable member can be detached from the one side member and secured to said binding member of said elongated hay bale and said lifting arrangement operated to pull the elongated hay bale onto and along at least said portion of the interior surface of the one side member in said second position toward the first, vertical axis of said elongated chute.

23. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute with the elongated chute adapted to receive an elongated bale of hay therein having a substantially square cross section and extending along an axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, and a lifting arrangement to raise said one side member from said second, open position to said first, closed position, said elongated chute with the one side member of said elongated chute in said first, closed position having upper and lower end sections vertically spaced from each other, the lower end section of said elongated chute having at least one opening to provide access therethrough to the interior of the elongated chute wherein the interior surface of the one side member extends substantially horizontally in said second, open position and said pivotally mounted one side member is movable to at least a third position about said horizontal axis thereof beyond said second, open position with at least said portion of the interior surface of the one side member inclined downwardly from the horizontal.

24. A hay feeder for livestock, said hay feeder having an elongated chute extending along and about a first axis, said first axis being substantially vertical and said elongated chute having a plurality of side members with respective interior surfaces extending along and facing inwardly toward said first, vertical axis, said interior surfaces together forming the interior of the elongated chute to receive an elongated bale of hay therein having a substantially square cross section and extending along a second axis, at least one of the side members of said elongated chute being mounted for pivotal movement about a substantially horizontal axis from a first, closed position with at least a portion of the interior surface thereof extending substantially vertically and at least a second, open position with at least a portion of the interior surface thereof facing upwardly, said elongated hay bale being positionable on at least said portion of the surface of said one side member in said second, open position with the second axis of the elongated hay bale extending substantially horizontally, and a lifting arrangement to raise said one side member with the elongated hay bale thereon from said second, open position to said first, closed position to raise said elongated hay bale to a substantially vertical position within said elongated chute with the second axis of said elongated hay bale extending substantially vertically to be substantially aligned with the first, vertical axis of said elongated chute, said elongated chute and said elongated hay bale with the one side member of said elongated chute in said first, closed position and the elongated hay bale positioned within the elongated chute respectively having upper and lower end sections vertically spaced from each other, the lower end section of said elongated chute having at least one opening to provide access therethrough to the lower end section of the elongated hay bale within said elongated chute wherein the elongated chute has a cross section substantially the same size and shape as the cross section of the elongated hay bale.

25. The hay feeder of claim 24 further including a member selectively positionable to cover and uncover the one opening in the lower end section of the elongated chute to selectively provide and prevent access therethrough to the lower end section of the elongated hay bale.

26. A method of loading a hay feeder for livestock with an elongated hay bale having a substantially square cross section and extending along a first axis, said method including the steps of:
(a) providing the feeder with an elongated chute extending along and about a second axis with said second axis being substantially vertical and said elongated chute having a plurality of side members with respective interior surfaces extending along and facing inwardly toward said second, vertical axis, the interior surfaces together forming the interior of the elongated chute for receiving the elongated hay bale therein,
(b) mounting at least one of the side members of the elongated chute for pivotal movement about a substantially horizontal axis from a first, closed position with at least a portion of the interior surface thereof extending substantially vertically and at least a second, open position with at least said portion of the interior surface thereof facing upwardly for receiving the elongated hay bale on at least said portion of the surface of said one side member in said second, open position with the first axis of the elongated hay bale extending substantially horizontally,
(c) providing a lifting arrangement for raising said one side member with the elongated hay bale positionable thereon from said second, open position to said first, closed position to raise said elongated hay bale positionable thereon to a substantially vertical position within said elongated chute with the first axis of said elongated hay bale extending substantially vertically to be substantially aligned with the second, vertical axis of said elongated chute, the elongated chute and the elongated hay bale with the one side member of said elongated chute in the first, closed position and the elongated hay bale positionable within the elongated chute respectively having upper and lower end sections vertically spaced from each other, and
(d) providing the lower end section of said elongated chute with at least one opening to provide access therethrough to the lower end section of the elongated hay bale positionable within the elongated chute and further including the steps of providing the lift arrangement with at least one cable member with an end section selectively attachable to the one side member at a location spaced from the horizontal axis thereof and selectively detachable therefrom and capable of being attached to a binding member extending about the elongated hay bale with the lifting arrangement being capable of pulling the elongated hay bale with the end section of the cable member attached to the binding member onto and along at least said portion of the interior surface of the one side member in said second position toward the second, vertical axis of said elongated chute.

27. The method of claim 26 the cable end section is capable of being detached from the binding member and reattached to the one side member at said location.

28. The method of claim 26 wherein step (a) includes the further limitation of providing the elongated chute with at least four side members.

29. The method of claim 26 wherein step (a) includes the further limitation of providing the elongated chute with at least four side members with respective substantially flat, interior surfaces.

30. A method of loading a hay feeder for livestock with an elongated hay bale having a substantially square cross section and extending along a first axis, said method including the steps of:
(a) providing the feeder with an elongated chute extending along and about a second axis with said second axis being substantially vertical and said elongated chute having a plurality of side members with respective interior surfaces extending along and facing inwardly toward said second, vertical axis, the interior surfaces together forming the interior of the elongated chute for receiving the elongated hay bale therein,
(b) mounting at least one of the side members of the elongated chute for pivotal movement about a substantially horizontal axis from a first, closed position with at least a portion of the interior surface thereof extending substantially vertically and at least a second, open position with at least said portion of the interior surface thereof facing upwardly for receiving the elongated hay bale on at least said portion of the surface of said one side member in said second, open position with the first axis of the elongated hay bale extending substantially horizontally,
(c) providing a lifting arrangement for raising said one side member with the elongated hay bale positionable thereon from said second, open position to said first, closed position to raise said elongated hay bale positionable thereon to a substantially vertical position within said elongated chute with the first axis of said elongated hay bale extending substantially vertically to be substantially aligned with the second, vertical axis of said elongated chute, the elongated chute and the elongated hay bale with the one side member of said elongated chute in the first, closed position and the elongated hay bale positionable within the elongated chute respectively having upper and lower end sections vertically spaced from each other, and
(d) providing the lower end section of said elongated chute with at least one opening to provide access therethrough to the lower end section of the elongated hay bale positionable within the elongated chute wherein step (b) includes the further limitation the one side member is capable of being pivoted to at least a third position about said horizontal axis thereof beyond said second, open position with at least said portion of the interior surface of the one side member inclined downwardly from the horizontal.

31. The method of claim 30 further including the steps of providing the lift arrangement with at least one cable member with an end section selectively attachable to the one side member at a location spaced from the horizontal axis thereof and selectively detachable therefrom and capable of being attached to a binding member extending about the elongated hay bale the lifting arrangement being capable of pulling the elongated hay bale with the end section of the cable member attached to the binding member onto and along at least said portion of the interior surface of the one side member in said third position toward the second, vertical axis of said elongated chute.

* * * * *